(12) United States Patent
Takahashi et al.

(10) Patent No.: US 9,400,416 B2
(45) Date of Patent: Jul. 26, 2016

(54) ILLUMINATION LIGHT SOURCE DEVICE INCLUDING A REFLECTING-TRANSMITTING ELEMENT, PROJECTION DEVICE INCLUDING THE ILLUMINATION LIGHT SOURCE DEVICE AND METHOD TO CONTROL THE PROJECTION DEVICE

(71) Applicants: Tatsuya Takahashi, Shinagawa-ku (JP); Kazuhiro Fujita, Machida (JP); Toshiharu Murai, Kawasaki (JP); Ikuo Maeda, Sagamihara (JP); Takehiro Nishimori, Yokohama (JP)

(72) Inventors: Tatsuya Takahashi, Shinagawa-ku (JP); Kazuhiro Fujita, Machida (JP); Toshiharu Murai, Kawasaki (JP); Ikuo Maeda, Sagamihara (JP); Takehiro Nishimori, Yokohama (JP)

(73) Assignee: RICOH COMPANY, LTD., Tokyo (JP)

( * ) Notice: Subject to any disclaimer, the term of this patent is extended or adjusted under 35 U.S.C. 154(b) by 359 days.

(21) Appl. No.: 14/014,976

(22) Filed: Aug. 30, 2013

(65) Prior Publication Data
US 2014/0071407 A1    Mar. 13, 2014

(30) Foreign Application Priority Data

Sep. 12, 2012 (JP) .................................. 2012-200234

(51) Int. Cl.
*G03B 21/20* (2006.01)
*G03B 21/14* (2006.01)
(Continued)

(52) U.S. Cl.
CPC .............. *G03B 21/142* (2013.01); *F21V 13/08* (2013.01); *G03B 21/204* (2013.01); *G03B 33/08* (2013.01)

(58) Field of Classification Search
CPC ...................................................... G03B 21/204
See application file for complete search history.

(56) References Cited

U.S. PATENT DOCUMENTS 8,272,745 B2 * 9/2012 Shibasaki .............. G03B 21/28
                                                348/743
8,550,634 B2 * 10/2013 Tseng .................... G03B 21/14
                                                348/743
(Continued)

FOREIGN PATENT DOCUMENTS

CN          101937161 A       1/2011
CN          102692799 A       9/2012
(Continued)

OTHER PUBLICATIONS

U.S. Appl. No. 14/024,991, filed Sep. 12, 2013.
(Continued)

*Primary Examiner* — Bao-Luan Le
(74) *Attorney, Agent, or Firm* — Oblon, McClelland, Maier & Neustadt, L.L.P.

(57) ABSTRACT

An illumination light source device includes a reflection-transmission wheel provided on a light-path from an excitation light source and having a transmission region that transmits an excitation light and a reflection region reflecting the excitation light, a fluorescent wheel provided on at least one of the reflection light-path and the transmission light-path and having a fluorescent body emitting fluorescence when excited by the excitation light, and a control section turning-on the excitation light source while the boundary of the transmission region and the reflection region traverses the light-path, in order to provide an illumination light source device capable of preventing a deterioration of the fluorescent body, whereby improving a color reproducibility by use of the color mixture occurred at the boundary region between the transmission light-path and the reflection light-path effectively and improving the brightness of image.

13 Claims, 30 Drawing Sheets

(51) Int. Cl.
   *F21V 13/08*    (2006.01)
   *G03B 33/08*    (2006.01)

(56) References Cited

U.S. PATENT DOCUMENTS

| | | | |
|---|---|---|---|
| 8,794,765 B2* | 8/2014 | Shibasaki | H04N 9/3111 |
| | | | 353/30 |
| 8,926,109 B2* | 1/2015 | Lin | G03B 21/204 |
| | | | 362/231 |
| 2004/0165150 A1 | 8/2004 | Jorke | |
| 2010/0328625 A1 | 12/2010 | Miyazaki et al. | |
| 2010/0328632 A1 | 12/2010 | Kurosaki et al. | |
| 2011/0043765 A1* | 2/2011 | Shibasaki | G03B 21/28 |
| | | | 353/31 |
| 2011/0063581 A1 | 3/2011 | Iwanaga | |
| 2012/0019785 A1* | 1/2012 | Tseng | G03B 21/14 |
| | | | 353/31 |
| 2012/0243205 A1* | 9/2012 | Lin | G03B 21/204 |
| | | | 362/84 |
| 2012/0249976 A1* | 10/2012 | Shibasaki | H04N 9/3111 |
| | | | 353/52 |
| 2013/0021587 A1 | 1/2013 | Miyazaki et al. | |
| 2013/0088689 A1* | 4/2013 | Lin | G03B 21/204 |
| | | | 353/31 |
| 2013/0114044 A1 | 5/2013 | Inoue et al. | |

FOREIGN PATENT DOCUMENTS

| | | |
|---|---|---|
| JP | 2010-085745 | 4/2010 |
| JP | 2011-013316 | 1/2011 |
| JP | 2011-065771 | 3/2011 |
| JP | 2011-118415 A | 6/2011 |

OTHER PUBLICATIONS

Combined Chinese Office Action and Search Report issued Apr. 1, 2015 in Patent Application No. 201310414799.4 (with English language translation).

* cited by examiner

ILLUMINATION LIGHT SOURCE DEVICE INCLUDING A REFLECTING-TRANSMITTING ELEMENT, PROJECTION DEVICE INCLUDING THE ILLUMINATION LIGHT SOURCE DEVICE AND METHOD TO CONTROL THE PROJECTION DEVICE

CROSS-REFERENCE TO RELATED APPLICATION

The present application is based on and claims priority from Japanese Patent Application Number 2012-200234, filed on Sep. 12, 2012, the disclosure of which is hereby incorporated by reference herein in its entirety.

BACKGROUND OF THE INVENTION

1. Field of the Present Invention

The present invention relates to an illumination light source device, a projection device including the illumination light source device and an improved method to control the projection device.

2. Description of the Related Art

Conventionally, light source devices employing a high-intensity discharge lamp such as an extra high pressure mercury lamp, as illumination light source devices for projection devices (projector) projecting on-screen information of a personal computer (hereinafter referred to as "PC") at conferences and meetings have been known.

However, the discharge lamp takes a necessary time to emit light stably after start of lighting, while enables high-brightness at low cost.

Then, using a solid-state light-emitting element such as a light-emitting diode or an organic light emitting diode of red (R), green (G), and blue (B) as an alternate light source in place of the discharge lamp has been proposed and put into practical use.

By using the solid-state light-emitting element as a light source for a projector, the projector can be started-up quickly and can be configured to accomplish a care of environment.

Then, for example, Japanese Patent Application Publication No. 2011-013316 (Patent Document 1) and Japanese Patent Application Publication No. 2010-085745 (Patent Document 2) were developed to solve the problem mentioned above.

As the illumination light source device employing the solid-state light-emitting element, for example, it is widely known that the skill to obtain a colored projection image by irradiating a fluorescent body with laser light as a excitation light emitted by a blue laser diode used as a first light source (excitation light source), producing each light of R, G, and B by exiting the fluorescent body, and controlling gradation each light of R, G, and B by use of a light modulation device such as a DMD (Digital Micromirror Device)(refer to Patent Document 1).

An illumination light source device according to Patent Document 1 includes a luminescent plate (fluorescent wheel) composed of a fluorescent body layer having a plurality of segmented regions divided in a rotational direction and emitting fluorescent light by receiving excitation light and a transmission region transmitting the excitation light directly, a first light source irradiating the fluorescent body with the excitation light, a second light source emitting light of a different wavelength from both of the excitation light and the fluorescence emitted by the fluorescent body layer, a light collection optical system collecting light emitted by the luminescent plate (fluorescent wheel) and the light emitted by the second light source on the same light-path, and an emission control section controlling the first light source and the second light source.

The emission control section turns off the first light source not to emit a light by the first light source and turn on the second light source to emit a light by the second light source, in order to prevent a color mixture at a boundary of adjacent segmented regions.

The illumination light source device according to Patent Document 1 can prevent the color mixture at the boundary of the adjacent segmented regions by being configured to control to turn off the first light source at the boundary. However, a time period that the segmented region is irradiated with the excitation light per unit time (one second) is constant regardless of its revolutions of the fluorescent wheel per unit time (one second), since the illumination light source device is configured so that the fluorescent body of the fluorescent wheel is directly irradiated with the excitation light. Therefore, a fluorescence property of the fluorescent body may be deteriorated if a mini-region of the segmented region remains irradiated with the excitation light.

Now, there are being developed illumination light source devices capable of keeping the fluorescent property of the fluorescent body from deteriorating by enabling the fluorescent body to change the time that being irradiated with the excitation light in unit time by providing a reflection-transmission wheel as a reflection-transmission member having a transmission region and the reflection region on a light-path of the excitation light emitted by the first light source, providing a fluorescent wheel as a fluorescent member on at least one of a transmission light-path made of the transmission region and a reflection light-path made of the reflection region, and switching the light-path of the excitation light between the transmission light-path and the reflection light-path in an unit time (one second) of rotation of the fluorescent wheel.

However, a color mixture occurs when the reflection-transmission wheel is irradiated with the excitation light while a boundary region between the reflection region and the transmission region is passing through, even if the illumination light source device is configured so that the reflection-transmission wheel is provided on the light-path of the excitation light emitted by the first light source.

Moreover, to prevent the color mixture, turning off an excitation light source while the boundary region between the reflection region and the transmission region is passing through the light-path of the excitation light is one idea. But, such a configuration to turn off the excitation light source decreases the brightness.

SUMMARY OF THE INVENTION

The present invention is made in view of the above, and an object thereof is to provide an illumination light source device capable of further preventing the deterioration of a fluorescent body, capable of improving a color reproducibility by obtaining a lot of colors by use of the color mixture generated at a boundary region between a transmission light-path and a reflection light-path effectively and capable of improving brightness of an image, a projector including the illumination light source device and a method to control the projector.

An illumination light source device according to an embodiment of the present invention includes a reflection-transmission member provided on a light-path of an excitation light from an excitation light source having a transmission region transmits an excitation light as an optical wavelength and a reflection region reflecting the excitation light from the excitation light source and the transmission region and the reflection region sequentially traverse the light-path of the excitation light from the excitation light source, a fluorescent body member provided on at least one of the reflection light-path formed of the reflection region or the transmission light-path formed of the transmission region having the fluorescent body emitting fluorescence when excited by the excitation light, and a control section turning-on the excitation light source while the boundary of the transmission region and the reflection region of the reflection-transmission wheel traverses the light-path of the excitation light.

The illumination light source device according to the present invention is configured so that the fluorescent body is excited by the excitation light led by at least one of the transmission region and the reflection region of the reflection-transmission member, and a time that the fluorescent body is irradiated with the excitation light in unit time can be shortened, thus a deterioration of the fluorescent body can be prevented.

Moreover, the illumination light source device according to the present invention can improves the color reproducibility by obtaining a wide variety of colors by use of the color mixture occurred in the boundary region between the transmission light-path and the reflection light-path effectively, and improves the brightness of projection image, because of having a configuration so that the excitation light source is turned-on while the boundary between the transmission region and the reflection region on the reflection-transmission member traverses the light-path of the excitation light-path.

BRIEF DESCRIPTION OF THE DRAWINGS

FIG. 13 illustrates other examples of the reflection-transmission wheel wherein FIGS. 13C, 13D, and 13E illustrate a state that the reflection region is split into a beam-splitter region and the total reflection region, wherein FIG. 13C illustrates a state that forward boundary of the beam-splitter region in rotational direction is overlapped with one of the tangent, FIG. 13D illustrates a state that the boundary between the beam-splitter region and the total reflection region is overlapped with one of the tangent, FIG. 13E illustrates a state that forward boundary of the total reflection region in rotational direction is overlapped with other tangent;

FIG. 15 illustrates white-light generation wherein

DETAILED DESCRIPTION OF THE PREFERRED EMBODIMENTS

Embodiments of the present invention will be described hereinafter in detail with reference to the accompanying drawings.

<First Embodiment>

Figure 1:
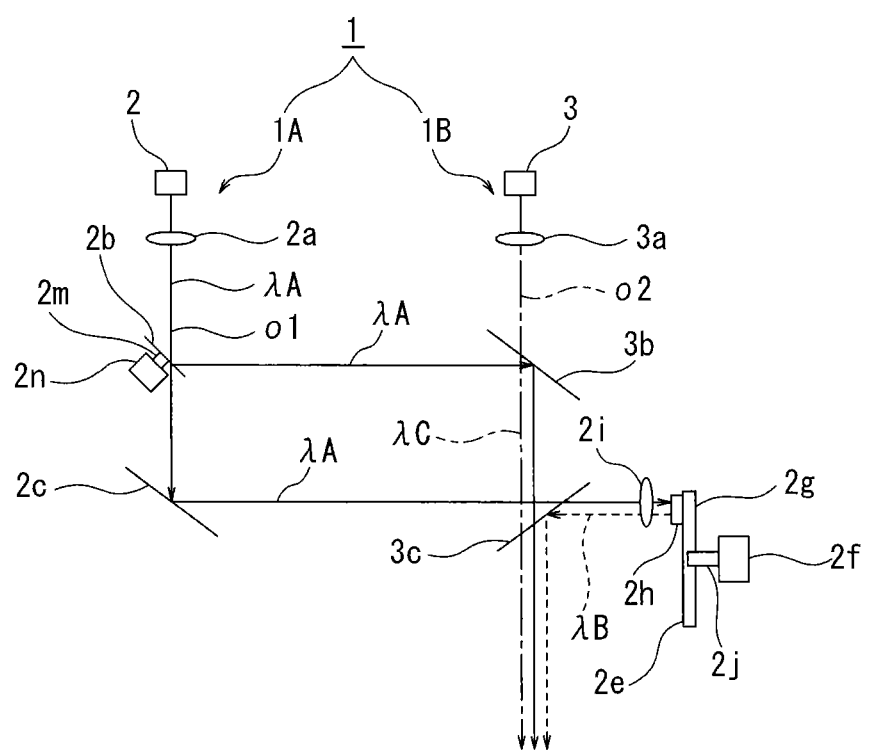
FIG. 1 illustrates an optical system of an illumination light source device according to a first embodiment of the present invention.

FIG. 1 illustrates an optical system of a light source device according to a first embodiment of the present invention wherein numeral 1 shows an illumination optical system.

(Schematic Configuration of the Illumination Optical System 1)

In this case, the illumination optical system has two illumination light sources (hereinafter referred to as "light sources") 2, 3. The light source 2 forms a part of a first illumination optical system 1A, and the light source 3 forms a part of a second illumination optical system 1B.

The first illumination optical system 1A is schematically composed of a coupling lens 2a as a first optical element, a reflection-transmission wheel 2b as a reflection-transmission member, a total reflection mirror 2c, and a fluorescent wheel 2e as a fluorescent body member.

The reflection-transmission wheel 2b is arranged on a light-path of the light source 2. The light-path of the light source 2 is split into a transmission light-path and a reflection light-path by a transmission region and a reflection region of the reflection-transmission wheel 2b (it will be described later).

The second illumination optical system 1B is schematically composed of a coupling lens 3a, a dichroic mirror 3b, and a dichroic mirror 3c. The dichroic mirror 3b and the dichroic mirror 3c are shared by the first illumination optical system 1A.

The fluorescent wheel 2e is formed of a disk-shaped substrate 2g and a fluorescent body 2h, and arranged on the transmission light-path formed by the transmission region of the reflection-transmission wheel 2b. A collecting element 2i is provided on a front side of the fluorescent wheel 2a.

(Detailed Configuration of the First Illumination Optical System 1A)

The light source 2 is a solid-state light-emitting element emitting an excitation light of a short wavelength. For example, a blue laser diode emitting a blue laser light as a visible light is used as the light source 2. Note that, a light-emitting diode emitting a blue light can be used in place of the blue laser diode. Here, the light source 2 emits light in a wavelength λA (400 nm<λA<450 nm).

Figure 2:
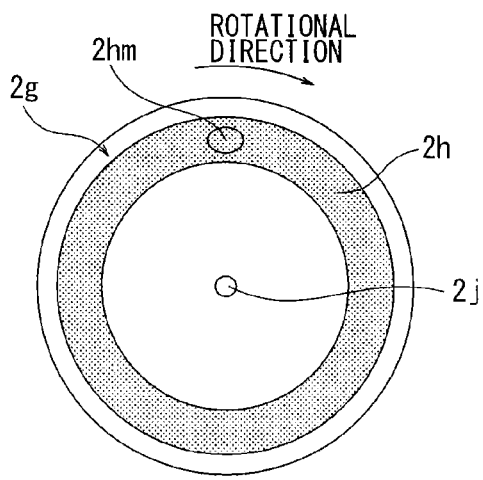
FIG. 2 is an enlarged plan view of a fluorescent wheel in the illumination light source device shown in FIG. 1.

FIG. 2 illustrates the disk-shaped substrate 2g of the fluorescent wheel 2e viewed from the side where the fluorescent body 2h is formed. The disk-shaped substrate 2g is formed of a reflection material, and the fluorescent body 2h is formed into a ring shape. The disk-shaped substrate 2g is rotationally driven by a drive part 2f as a second drive member on a rotating shaft 2j.

The light in the wavelength λA is reflected by the total reflection mirror 2c after transmitting the transmission region of the reflection-transmission wheel 2b, collected by the collecting element 2j, and irradiates the fluorescent wheel 2e.

At that time, a mini-region 2hm of the fluorescent body 2h is irradiated with the light in the wavelength λA in a spot as shown in FIG. 2. If the same mini-region 2hm of the fluorescent body 2h remains irradiated by the light in the wavelength λA, the fluorescent body 2h may become so called a "burnt" state, and a property of the fluorescent body 2h may be deteriorated or broken.

However, in the configuration according to the first embodiment, it is prevented that the same mini-region 2hm of the fluorescent body 2h continues to be irradiated with the light energy in the wavelength λA and the property of the fluorescent body 2h is deteriorated since the disk-shaped substrate 2g is constantly rotationally driven on a rotating shaft 2j and the mini-region of the fluorescent body 2hm irradiated with the light in the wavelength λA is temporally-shifted. Note that, a rotating speed of the disk-shaped substrate 2g is not limited in particular.

Note that, the first embodiment is configured to prevent that the same mini-region of a fluorescent body 2hm continues to be irradiated by the light in the wavelength λA by rotating the disk-shaped substrate 2g, but not limited to this configuration. For example, the mini-region 2hm of the fluorescent body 2h irradiated with the light in the wavelength λA can be temporally-shifted by employing a rectangle-shaped substrate (not shown) in place of the disk-shaped substrate 2g, forming the fluorescent body 2h extending in a longitudinal direction of the rectangle-shaped substrate, and periodically reciprocating the rectangle-shaped substrate in a longitudinal direction and in a direction perpendicular to the light in the wavelength λA.

The fluorescent body 2h is excited by the light in the wavelength λA and emits fluorescence in a wavelength λB longer than the wavelength λA as shown in FIG. 1. For example, a range of the wavelength λB is within 495 nm<λB<570 nm which is a green fluorescence.

The fluorescence in the wavelength λB is reflected by disk-shaped substrate 2g, collected by a collecting element, and emitted from the fluorescent wheel 2e.

Figure 3:
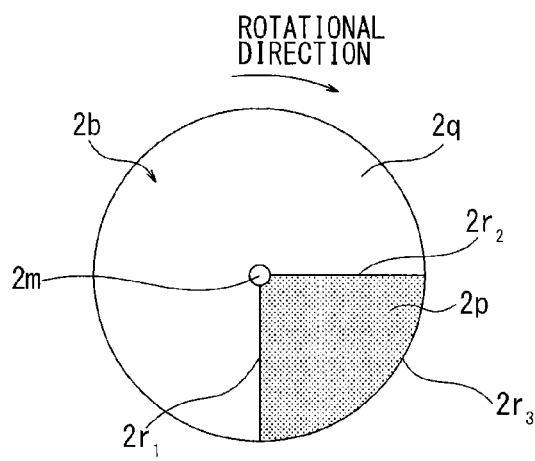
FIG. 3 is an enlarged plan view of a reflection-transmission wheel in the illumination light source device shown in FIG. 1.

The reflection-transmission wheel 2b is rotationally driven on a rotating shaft 2m by a drive part 2n as a first drive member. The reflection-transmission wheel 2b has a fan-shaped reflection region 2p bounded by two radial region boundary $2r_1$, $2r_2$ and an arc $2r_5$ as shown in FIG. 3.

The reflection region 2p has a function that totally reflects the light in the wavelength λA. The rest of the reflection region 2p of the reflection-transmission wheel 2b is a transmission region 2q totally transmitting the light in the wavelength λA.

In the first embodiment, the reflection-transmission wheel 2b is formed of a transparent disk with the fan-shaped reflection region 2p, that is to say the rest of the reflection region 2p is the transmission region 2q. But, if the reflection-transmission wheel 2b is formed by the fan-shaped reflection region 2p itself, a material can be saved, and the production cost for a device can be reduced.

Note that, in the first embodiment, an angular range of the fan-shaped reflection region 2p, a pivot point thereof is the rotating shaft 2m, is 90 degrees, but a dimension of the reflection region 2p is not limited to this.

Moreover, in the first embodiment, the reflection region 2p and the transmission region 2q are switched by rotating the reflection-transmission wheel 2b, but the reflection region 2p and the transmission region 2q can be switched by reciprocating the rectangle-shaped substrate.

The reflection-transmission wheel 2b is arranged obliquely relative to an optical axis O1 of the light-path of the first illumination optical system 1A. In the first embodiment, the reflection-transmission wheel 2b is arranged at 45 degrees relative to the optical axis O1, but it is not limited to this angle if the light-path of the excitation light in the wavelength λA can be switched.

Furthermore, the incidence of speckle pattern can be decreased by using the diffuser panel in place of the transmission region 2q of the reflection-transmission wheel 2b.

The reflection-transmission wheel 2b is appropriately rotated in synchronization with the image data, and the transmission light-path and the reflection light-path are appropriately selected corresponding to the color of the image data to be formed. Here, for example, the reflection-transmission wheel 2b rotates 30 times every second, and rotates once or twice every one frame (e.g., 1/30 seconds).

Namely, the light in the wavelength λA emitted from the light source 2 is led to the reflection-transmission wheel 2b via the coupling lens 2a. Next, the light in the wavelength λA is reflected by the reflection region 2p of the reflection-transmission wheel 2b and led to the dichroic mirror 3b when the reflection region 2p is placed at the light-path of the first illumination optical system 1A, on the other hand, the light in the wavelength λA is led to the total reflection mirror 2c through the transmission region 2q of the reflection-transmission wheel 2b when the transmission region 2q is placed at the light-path of the first illumination optical system 1A.

(Detailed Configuration of the Second Illumination Optical System 1B)

The light source 3 is the solid-state light-emitting element emitting the light in a wavelength λC longer than the wavelength λB. For example, the range of the wavelength λC is within 620 nm<λC<750 nm which is a red light. Note that, the numeral O2 refers to the optical axis of the second illumination optical system 1B.

The dichroic mirror 3b has a function that reflects the light in the wavelength λA and transmits the wavelength λC. The dichroic mirror 3c has the function that transmits the light in the wavelength λA and a light in the wavelength λC and reflects a light in the wavelength λB.

(Detailed Light-Path Formed of the Reflection-Transmission Wheel 2b, the Dichroic Mirror 3b, and the Dichroic Mirror 3c)

When the reflection region 2p of the reflection-transmission wheel 2b is placed at the light-path of the first illumination optical system 1A, the light in the wavelength λA is reflected by the reflection region 2p, lead to and reflected by the dichroic mirror 3b, and emitted as a blue light from the first illumination optical system 1 through the dichroic mirror 3c.

When the transmission region 2q of the reflection-transmission wheel 2b is placed at the light-path of the first illumination optical system 1A, the light in the wavelength λA transmits the transmission region 2q, and is reflected by the total reflection mirror 2c, and led to the fluorescent wheel 2e through the dichroic mirror 3c.

The light in the wavelength λA is collected by the collecting element 2i and irradiates the miniregion of the fluorescent body 2hm (see FIG. 2) of the fluorescent body 2h, then the fluorescent body 2hm is excited and emits the light in the wavelength λB.

The light in the wavelength λA and the light in the wavelength λB are reflected by the disk-shaped substrate 2g, collected by the collecting element 2i, and led to the dichroic mirror 3c. The light in the wavelength λA traverses the dichroic mirror 3c, on the other hand, the light in the wavelength λB is reflected by the dichroic mirror 3c and emitted as a green light from the first illumination optical system 1.

The light in the wavelength λC is led to the dichroic mirror 3b through the coupling lens 3a, and emitted as the red light from the first illumination optical system 1 through the dichroic mirror 3b and the dichroic mirror 3c.

The dichroic mirror 3c functions as a light-path junction element forming the converged light-path by converging on the transmission light-path and the reflection light-path which split by the reflection-transmission wheel 2b.

According to the first embodiment, the light-path of the excitation light is split into the transmission light-path and the reflection light-path by providing the reflection-transmission wheel 2b, and a time that the fluorescent body is irradiated with the excitation light in unit time (one second) can be shortened, thus a deterioration of the fluorescence property of the fluorescent body can be prevented.

(A Problem of the Color Mixture at the Boundary between the Reflection Region 2p and the Transmission Region 2q of the Reflection-Transmission Wheel 2b)

Figure 4:
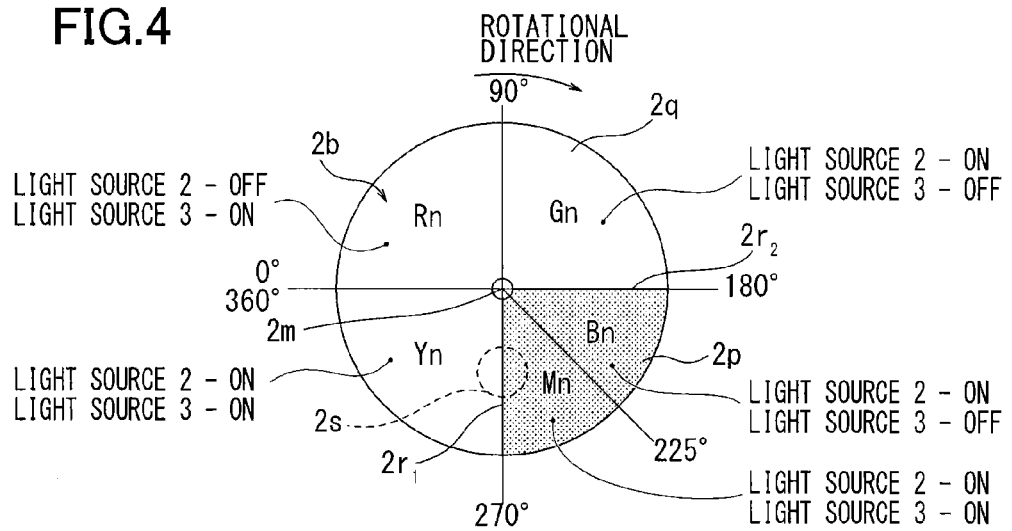
FIG. 4 illustrates a relationship between the reflection-transmission wheel and a light-path of a first illumination optical system in the illumination light source device shown in FIG. 1.

The light in the wavelength λA traverses the reflection-transmission wheel 2b with given dimension as shown in FIG. 4. That is to say, the reflection-transmission wheel 2b is irradiated with the light in the wavelength λA as a spot. In FIG. 4, reference numeral 2s refers to the spot region (dimension of the light-path) that the reflection-transmission wheel 2b is irradiated with the light in the wavelength λA.

When the light in the wavelength λA irradiates a boundary region of the reflection-transmission wheel 2b, the light in the wavelength λA (blue) reflected by the reflection region 2p is reflected by the dichroic mirror 3b and emitted from the first illumination optical system 1. On the other hand, the light in the wavelength λA traversed the transmission region 2q is reflected by the total reflection mirror 2c, led to the fluorescent wheel 2e through the dichroic mirror 3c, excites the fluorescent body 2h of the fluorescent wheel 2e, and the green fluorescence (the light in the wavelength λB) from the fluorescent body 2h is reflected by the dichroic mirror 3c and emitted from the first illumination optical system 1.

Thereby, the light which is a mixture of blue light and green right is emitted from the first illumination optical system 1. Therefore, color mixture is occurred when region boundary $2r_1$, $2r_2$ between the reflection region 2p and the transmission region 2q of the reflection-transmission wheel 2b traverse the light-path of the first illumination optical system 1A. For example, an image of cyan is periodically produced when an image of blue or green is demanded, and color purity is impaired.

If the light source 2 is turned off in order to prevent the occurrence of the color mixture when the boundary region of the reflection-transmission wheel 2b traverses the light-path (spot region), the brightness is decreased since the illumination light from the light source 2 is fail to efficiently utilized.

Then, in the first embodiment, the light source 2 is turned on positively regardless of the image data and the light source 3 is also turned on in synchronization with the light source 2 when the region boundary $2r_1$, $2r_2$ between the reflection region 2p and the transmission region 2 of the reflection-transmission wheel 2b traverse the light-path of the first illumination optical system 1A.

As the result, decreasing of the brightness can be prevented and the color reproducibility can be improved when the region boundary $2r_1$, $2r_2$ between the reflection region 2p and the transmission region 2q of the reflection-transmission wheel 2b traverses the light-path. The controlling of the lighting-up will hereinafter be described in detail.

<Second Embodiment>

Figure 5:
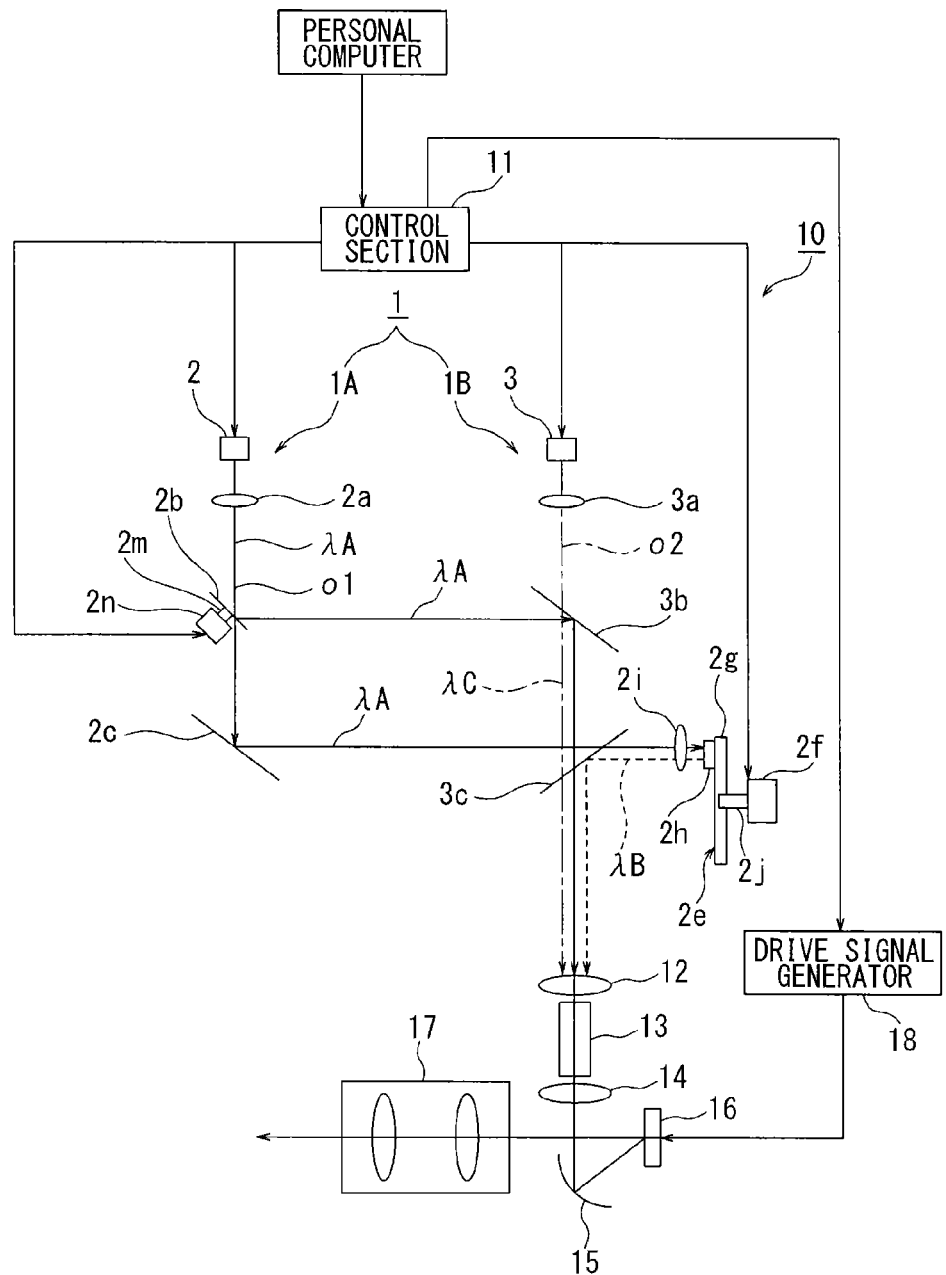
FIG. 5 illustrates an example of a configuration of a projection device according to a second embodiment of the present invention using the illumination light source device shown in FIG. 1.

FIG. 5 illustrates a second embodiment of the configuration of a projection device 10 using the illumination optical system 1 according to the first embodiment. In FIG. 5, elements which are same as in the first embodiment are provided by attaching same numerals thereto and their detailed descriptions are omitted.

The projection device 10 has a control section 11 controlling the illumination optical system 1, a collecting element 12, an integrator 13, a collecting element 14, a reflection mirror 15, an image generator 16, and a projection lens 17 provided on the light-path forward of the illumination optical system 1. The collecting element 12, the integrator 13, the collecting element 14, the reflection mirror 15, the image generator 16, and the projection lens 17 forms a projection optical system.

The light flux in the wavelength λA, λB, and λC are collected by the collecting element 12, diffused uniformly by the integrator 13 to remove an uneven light intensity and irradiates the image generator 16 through the collecting element 14 and the reflection mirror 15. Hereinafter, the configuration and the function of the image generator 16 will be described. The control section 11 will be described later.

(Configuration and Function of the Image Generator 16)

In the image generator 16, image generation data are inputted. The image generator 16 is formed of, for example, a DMD (Digital Micromirror Device) which is publicly known.

The DMD has pixel-based micromirrors. The each angle of the micromirrors is two-position controlled, and the micromirror can control the gradation by controlling the repeating time interval of the two-position control.

Then, the full-color images are generated by use of persistence of vision by irradiating each color of RGB, R (red: wavelength λC), G (green: wavelength λB), and B (blue: wavelength λA) in a time frame of the image by switching, driving the image generator 16 by micromirror drive signal based on the pixel-based image generation data in synchronization with the timing of the irradiating of the each color of RGB.

(Configuration and Function of the Control Section 11)

The control section 11 has a CPU (Central Processing Unit), a ROM (Read Only Memory), and a RAM (Random Access Memory).

The control section 11 totally controls a performance of the projection device 10 in accordance with the program memorized in advance by use of the RAM as a working memory.

Furthermore, the control section 11 has an interface (not shown) to external information equipment and can road image data from, for example, a personal computer.

And the control section 11 processes the loaded image data, and generates the image generation data adapted to drive the image generator 16.

The image generation data is inputted to a drive signal generator 18, the drive signal generator 18 generates a drive signal based on the image generation data, and the drive signal outputted to the image generator 16.

Moreover, the control section 11 controls the lighting-up of the light sources 2, 3, and the rotation of the drive parts 2f, 2n.

Hereinafter, an embodiment of controlling by the control section 11 will be described with reference to FIG. 6.

Figure 6:
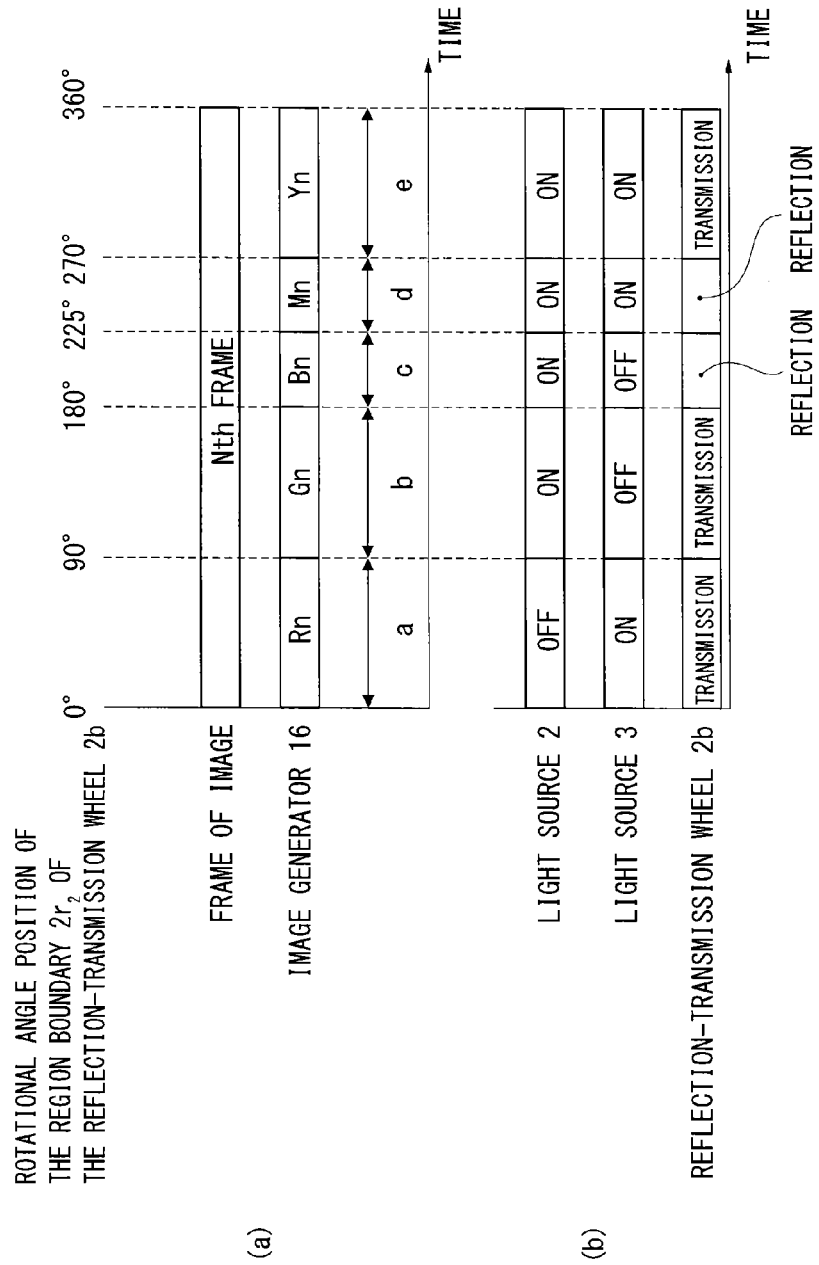
FIG. 6 illustrates an example of a relationship among a color of light irradiating with an image generator shown in FIG. 5, on/off timing of each light source, and reflection/transmission of the reflection-transmission wheel, in relationship to a frame of images.

FIG. 6(a) illustrates a formation time T of the Nth frame of images (e.g., T=1/30 sec) corresponding to the rotational angle position of the reflection-transmission wheel 2b, for example, by dividing the time T into five time period. In FIG. 6, the time periods are indicated by the numeral a to e, and the light fluxes irradiates each time periods a to e are supposed to be Rn (red), Gn (green), Bn (blue), Yn (yellow), Mn (magenta).

FIG. 6(b) illustrates on/off timing of the light sources 2, 3, and reflection/transmission timing of the reflection-transmission wheel to each time periods a to e. In the time period a, i.e. the rotational angle position of the region boundary $2r_2$ is within the range of 0 to 90 degrees, the light-path of the first illumination optical system 1A is in the transmission region $2q$, when the light source 2 is turned off and the light source 3 is turned on by the control section 11, the image generator 16 is irradiated with the red light (Rn) by the second illumination optical system 1B.

In the time period b, i.e. the rotational angle position of the region boundary $2r_2$ is within the range of 90 to 180 degrees, when the light source 2 is turned on and the light source 3 is turned off by the control section 11, and the control section 11 controls the rotational angle position of the reflection-transmission wheel 2b is controlled by the control section 11 so that the transmission region $2q$ is in the light-path of the first illumination optical system 1A the image generator 16 is irradiated with the green light (Gn).

In the time period c, i.e. the rotational angle position of the region boundary $2r_2$ is within the range of 180 to 225 degrees, when the light source 2 is turned on and the light source 3 is turned off by the control section 11, and the rotational angle position of the reflection-transmission wheel 2b is controlled by the control section 11 so that the reflection region $2p$ is in the light-path of the first illumination optical system 1A in synchronization with the lighting timing of the light sources, the image generator 16 is irradiated with the blue light (Bn).

In the time period d, i.e. the rotational angle position of the region boundary $2r_2$ is within the range of 225 to 270 degrees, when the light source 2, 3 are turned on at the same time by the control section 11, and the rotational angle position of the reflection-transmission wheel 2b is controlled by the control section 11 so that the reflection region $2p$ is in the light-path of the first illumination optical system 1A, the image generator 16 is irradiated with the magenta light (Mn) by the principle of the additive color system since the blue light (Bn) and the red light (Rn) are emitted from the illumination optical system 1 at the same time.

In the time period e, i.e. the rotational angle position of the region boundary $2r_2$ is within the range of 270 to 360 degrees, when the light source 2, 3 are turned on at the same time by the control section 11, and the rotational angle position of the reflection-transmission wheel 2b is controlled by the control section 11 so that the transmission region $2q$ is in the light-path of the first illumination optical system 1A, the image generator 16 is irradiated with the yellow light (Yn) by the principle of the additive color system since the green light (Gn) and the red light (Rn) are emitted from the illumination optical system 1 at the same time.

Thus, according to the second embodiment, the full-color images can be generated and the gradation control can be achieved by two-position controlling of the irradiation timing of each light of red, green, blue, magenta, and yellow and the angle of each DMD by use of the persistence of vision, since the image generator 16 can be irradiated with the each colored light of red, green, blue, magenta, and yellow, within each time period, I.e. one of a time frame divided by five.

Note that, in this embodiment, the dimension of the light-path of the first illumination optical system 1A, i.e. the dimension of the spot region, is ignored, and only the rotational angle position of the region boundary $2r_2$ is described for the convenience of description. However, it is possible to relate 60 degrees of the rotation angular range of the reflection-transmission wheel 2b to each color, and to use rest of 60-degree angle where the color mixture is generates, i.e. both side of 30 degrees straddling the boundary, for white light with both the light source 2 and 3 turned on.

Furthermore, on/off timing of the light source 2, 3 and the color of light irradiating the image generator 16 are illustrated in FIG. 4 for ease of comprehension.

According to the second embodiment, the reflection light-path from the reflection region $2p$ of the reflection-transmission wheel 2b returns the same route since the disk-shaped substrate 2g of the fluorescent wheel 2e is made of a reflection material. Therefore, the illumination optical system 1 can be downsized.

(Detailed Description of the Controlling of the Rotational Angle Position of the Reflection-Transmission Wheel 2b by the Control Section 11)

Figure 7:
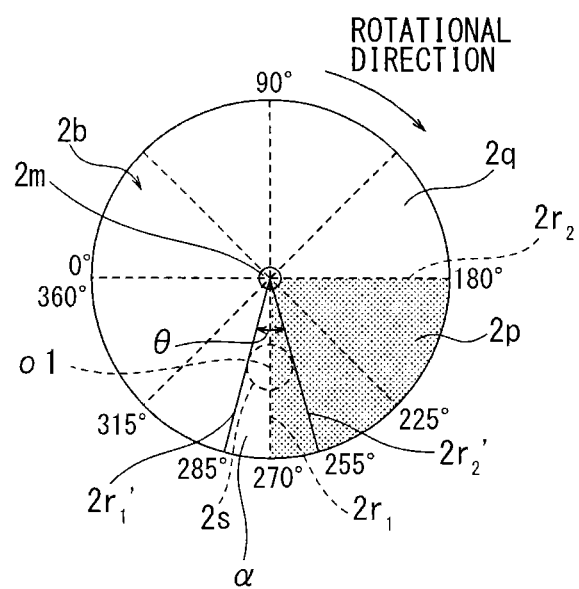
FIG. 7 illustrates a relationship between a rotational angle position of the reflection-transmission wheel shown in FIG. 1 and the light-path of the first illumination optical system shown in FIG. 1.

The reflection-transmission wheel 2b is rotated on the rotating shaft 2m so as to traverse the light-path from the first illumination optical system 1A as shown in FIG. 7.

Note that, a spot region 2s, which has the same dimension to the light-path of the illumination optical system, is indicated in FIG. 7 by dashed line in place of the light-path of the illumination optical system 1 for the convenience of description.

The region boundary $2r_1$, $2r_2$ between the reflection region $2p$ and the transmission region $2q$ traverses the spot region $2s$ once every 1 round.

Furthermore, the rotational angle positions in every rotation of the reflection-transmission wheel 2b are indicated in FIG. 7 with appropriate angles in clockwise direction from horizontal line (0 degrees) as a reference position, for the convenience of description.

In FIG. 7, two tangent lines extending in a radial direction from the center of the rotating shaft 2m and circumscribing on a circle of the spot region 2s are indicated as the reference numbers $2r_1'$, $2r_2'$.

The angle θ formed by the two tangent lines $2r_1'$, $2r_2'$ is dependent on a radius of the spot region 2s and the distance from the center of the rotating shaft 2m to the center of the spot region 2s (the optical axis O1).

Here, the angle θ is, for example, 30 degrees. When one of the region boundary $2r_1$ or the region boundary $2r_2$ is in a fun-shaped region a enclosed by the two tangent lines $2r_1'$, $2r_2'$ and an arc and the light source 2 is turned on, the light in the wavelength λA (blue) transmits the transmission region $2q$ and is reflected by the reflection region $2p$.

Thus, the light with the color mixture of the light in the wavelength λA (blue) reflected by the reflection region $2p$ and the dichroic mirror 3b, and the light in the wavelength λB (green) generated by being reflected by total reflection mirror 2c after passing through the transmission region $2q$ and led to the fluorescent wheel 2e, can be obtained.

(Description of a Block Diagram of a Specific Control by the Control Section 11)

Figure 8:
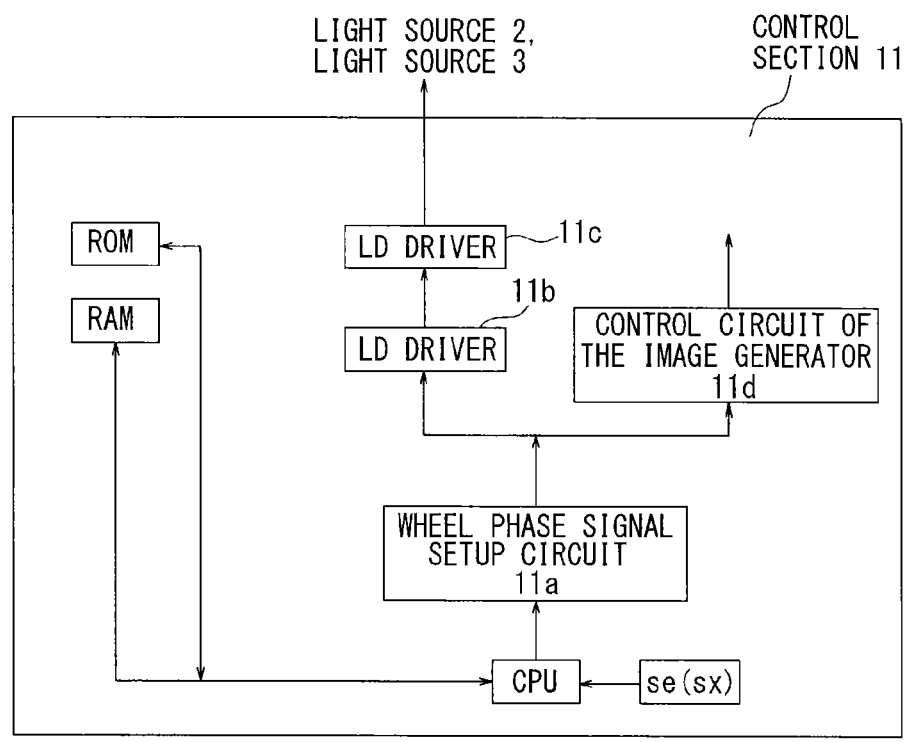
FIG. 8 is a block diagram illustrating the configuration of a control section shown in FIG. 5.

FIG. 8 is a block diagram illustrating the configuration of a control section. As noted earlier, the control section 11 has the CPU, the ROM, and the RAM, and totally controls the performance of the projection device 10 in accordance with the program memorized in advance by use of the RAM as the working memory.

The control section 11 has a wheel phase signal setup circuit 11a, an LD driver 11b, an LD drive circuit 11c, and an image generator control circuit 11d besides the circuit elements described above. The wheel phase signal setup circuit 11a sets up the wheel phase by obtaining the rotational angle position by the sensor Se described below.

Figure 9A:
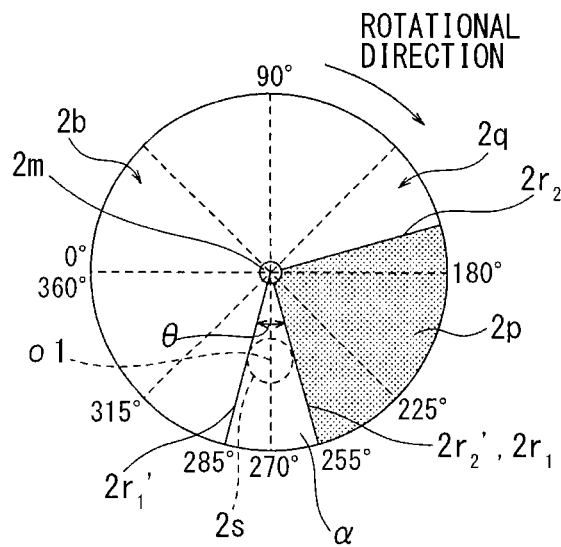
FIG. 9A illustrates a state that one boundary of the reflection-transmission wheel is overlaps with one of tangent to a spot region when the boundary traverses the spot region.
Figure 9B:
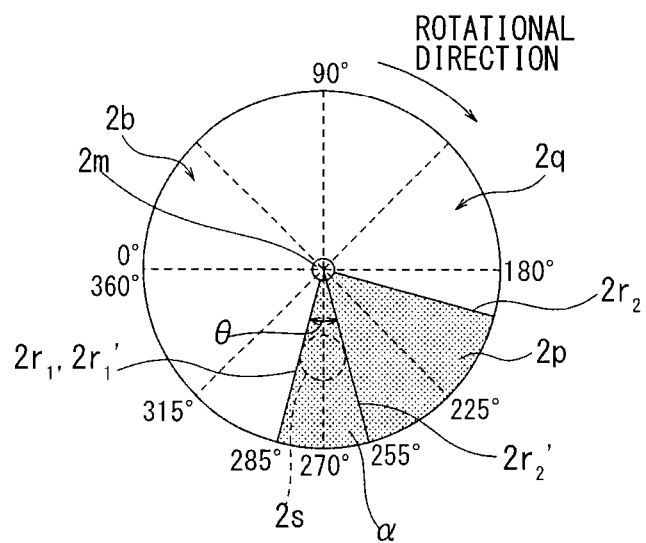
FIG. 9B illustrates a state in that one boundary of the reflection-transmission wheel overlaps with other tangent to a spot region when the boundary traverses the spot region.
Figure 10:
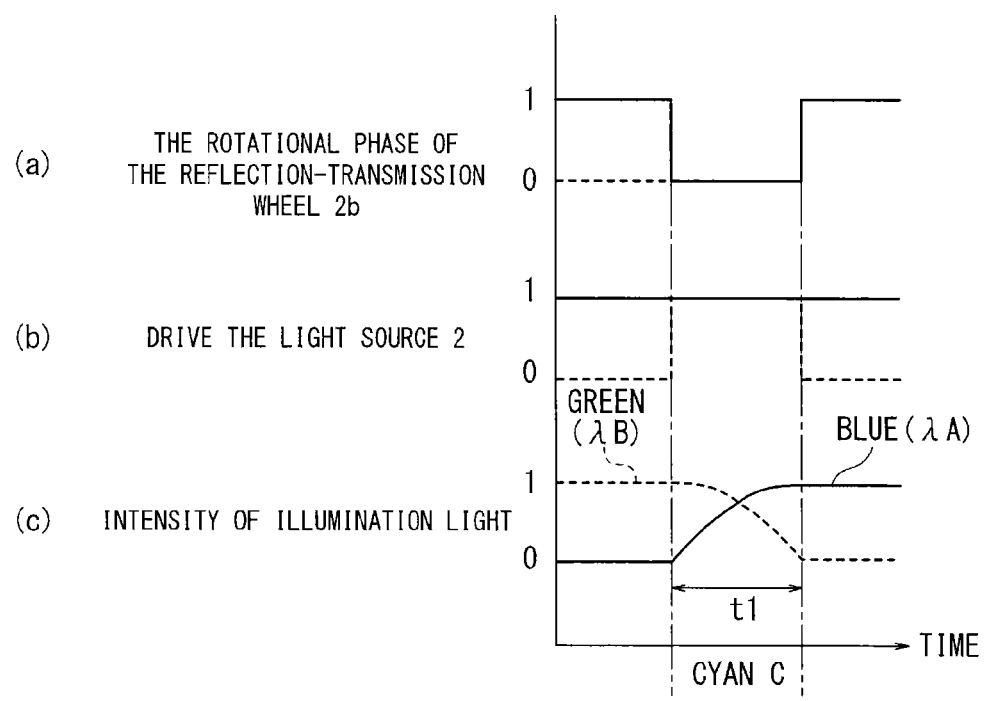
FIG. 10 illustrates a relationship among a rotational phase of the reflection-transmission wheel, a lighting of the second light source, and intensity of illumination light, wherein (a) illustrates the rotational phase of the reflection-transmission wheel, (b) illustrates on-state of the second light source, and (c) illustrates a relationship between intensity of excitation light at a wavelength λA and intensity of fluorescence at a wavelength λB corresponding to the rotational phase (a)

The control section 11 switches the wheel phase from "1" to "0" as shown in FIG. 10 by the wheel phase signal setup circuit 11a when the region boundary $2r_1$ (or region boundary $2r_2$) overlaps with one of a tangent line $2r_2'$ circumscribed on a circle of the spot region $2s$ as shown in FIG. 9A, and switches the wheel phase signal from "0" to "1" as shown in FIG. 10 by the wheel phase signal setup circuit 11a when the region boundary $2r_1$ (or region boundary $2r_2$) overlaps with another tangent line $2r_1'$ circumscribed on the circle of the spot region $2s$ as shown in FIG. 9B.

The wheel phase signal setup circuit 11a turns on the LD drive circuit 11c and the image generator control circuit 11d at least while the time t1, the time from the point that the wheel phase is changed from "1" to "0" to the point that the wheel phase is changed from "0" to "1".

By the LD driver 11b, the LD drive circuit 11c is driven and at least the light source 2 is turned on while the time t1 from the point that the wheel phase is changed from "1" to "0" to the point that the wheel phase is changed from "0" to "1" as shown in FIG. 10.

Furthermore, the image generator control circuit 11d turns on the image generator 16 while the wheel phase is in "0". Thereby, a cyan light generated by mixture of blue light and green light is projected to the screen.

For example, as shown in FIG. 10(c) simplistically, when the light source 2 is turned on, the green fluorescence of constant intensity is emitted from the projection device 10 until just before that the region boundary $2r_1$ is circumscribed on the spot region $2s$. Then, the green fluorescence is decreased while the blue excitation light is increased by the region boundary $2r_1$ passing through the spot region $2s$, and when the time t1 is elapsed, becomes the blue light of constant intensity.

Note that, the angle θ is described as 30 degrees in this embodiment, but not limited to the angle θ=30, since the angle θ is dependent on the radius of the spot region $2s$ and the distance from the center of the rotating shaft $2m$ to the center of the spot region $2s$ (the optical axis O1).

(An Example of the Coordination of a Creation Time of the Cyan Light)

FIG. 11, 12 illustrate the coordination of a creation time of the cyan light by adjusting the dimension of the spot region $2s$.

Figure 11A:
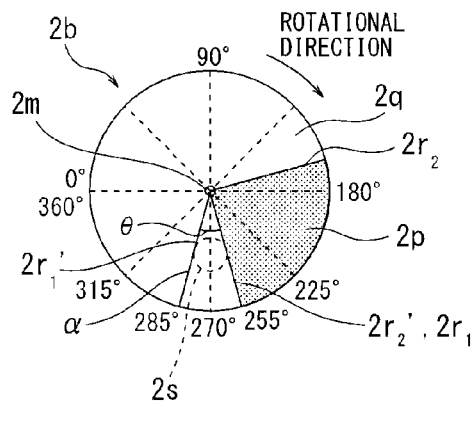
FIG. 11 illustrates variations of angular range of the spot region wherein FIGS. 11A, B are same to FIGS. 9A, B and reposted for reference, and FIGS. 11C,D are FIGS. 11A, B wherein the angular range is doubled.
Figure 11B:
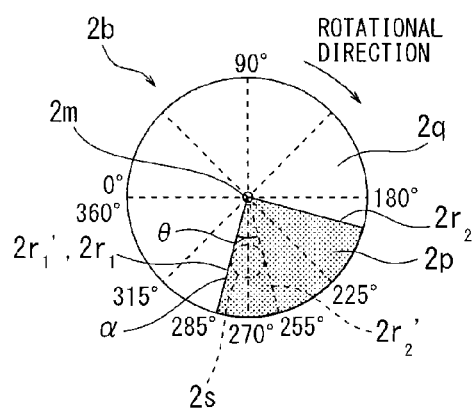
Figure 11C:
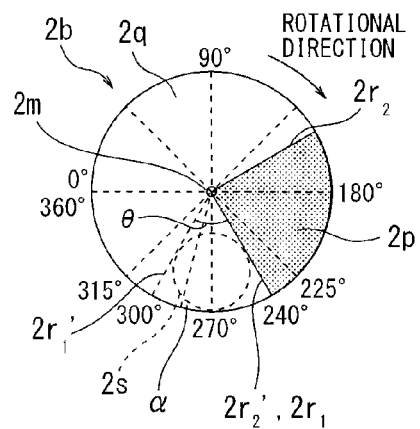
Figure 11D:
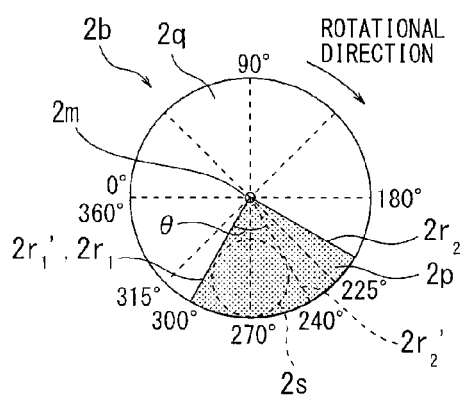

FIG. 11A, B are same to FIG. 9A, B and reposted for reference, and FIG. 11C,D illustrate the angle θ (=30 degrees) formed by the tangent lines $2r_1'$, $2r_2'$ on the spot region $2s$ are changed to 2θ (=60 degrees).

Figure 12:
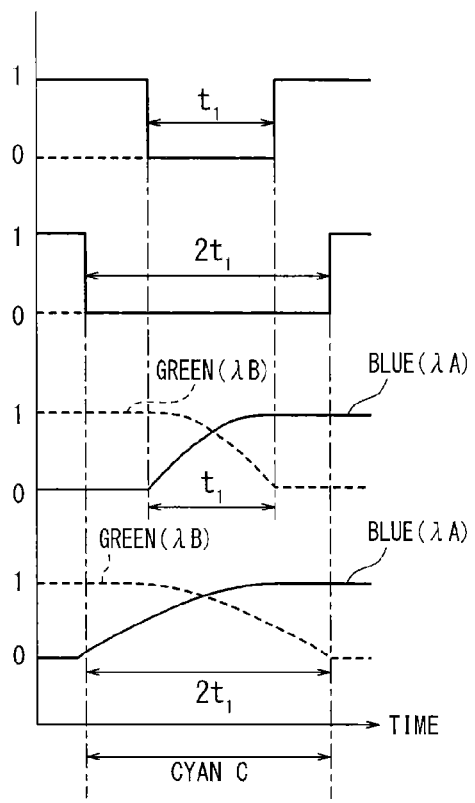
FIG. 12 illustrates an example of a relationship of intensity between the wheel-rotational phase of the reflection-transmission wheel and the illumination wherein (a) and (c) are same to FIG. 10(a)(c) and reposted for reference, (b) illustrates the wheel-rotational phase corresponding to FIGS. 11C, and 11D, and (d) illustrates a relationship between the intensity of the excitation light at the wavelength λA and the intensity of fluorescence at the wavelength λB corresponding to the wheel-rotational phase shown in FIG. 12(b)

Thus, when the angle θ formed by the tangent lines $2r_1'$, $2r_2'$ of the spot region $2s$ is doubled, and it is assumed that the number of rotations of the reflection-transmission wheel $2b$ is constant, the time t1, where the wheel phase is "0", can be doubled as shown in FIG. 12(b) compared to FIG. 12(a). Thereby, the time t1 to emits the cyan light as shown in FIG. 12(d) compared to FIG. 12(c).

The dimension of the spot region $2s$ can be adjusted by moving the coupling lens $2a$ back and forth in an optical axis direction by use of a drive mechanism, or adjusting the rotating speed of the reflection-transmission wheel $2b$. Note that, these operations can be operated manually by button with watching the projected images.

(Another Example of the Coordination of a Creation Time of the Cyan Light)

FIG. 13, 14 illustrate another example of the coordination of a creation time of the cyan light by adjusting the dimension of the reflection region $2p$.

Figure 13A:
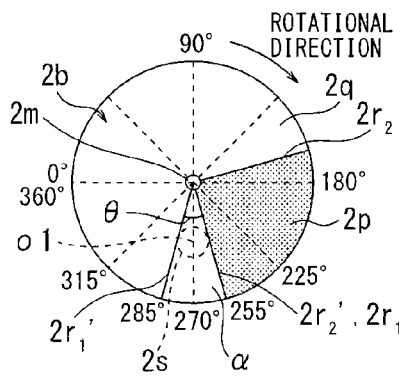
FIGS. 13A, and 13B are same to FIGS. 9A, and 9B and reposted for reference.
Figure 13C:
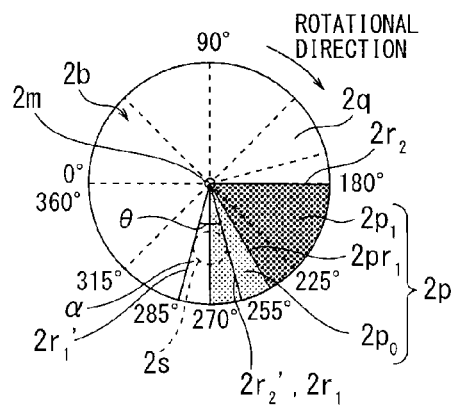
Figure 13B:
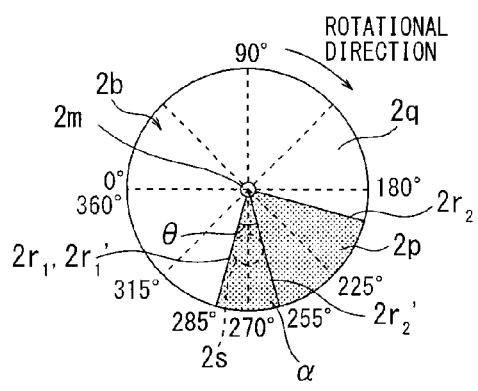
Figure 13D:
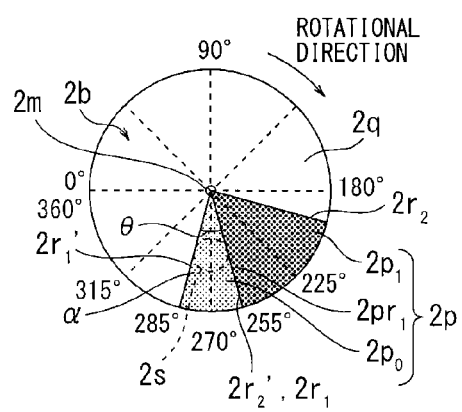
Figure 13E:
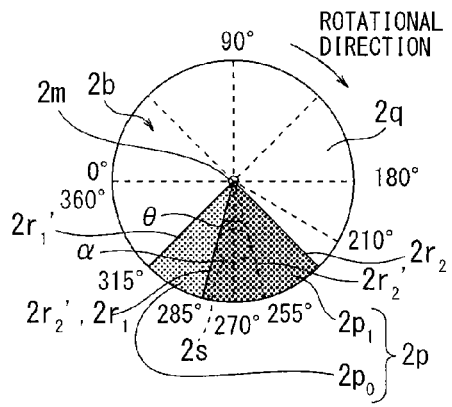

FIG. 13A, B are same to FIG. 9A, B and reposted for reference, and FIG. 13C to (e) illustrate the reflection-transmission wheel $2b$ wherein ⅓ angle region in the forward part of the reflection region $2p$ in rotational direction of the reflection-transmission wheel $2b$ is a semi-transmissive region $2p_0$ (beam splitter region), while ⅔ angle region the backward part in rotational direction is a total reflection region $2p_i$.

The reflection rate of the total reflection region $2p_1$ is 100%, and the reflection rate of the semi-transmissive region is settable conveniently. In this example, as shown in FIG. 13C, the cyan light is generated by the green fluorescence generated by the excitation light transmitted the semi-transmissive region $2p_0$ and the blue excitation light reflected by the semi-transmissive region, $2p_0$ while the time from the point that the region boundary $2r_1$ of the semi-transmissive region $2p_0$ contacts the tangent line $2r_2'$ to the point that the region boundary $2pr_1$ between the semi-transmissive region $2p_0$ and the total reflection region $2p_1$ contacts the tangent line $2r_2'$.

As shown in FIG. 13D, the cyan light is generated by the green fluorescence generated by the excitation light transmitted the semi-transmissive region $2p_0$ and the blue excitation light reflected by the total reflection region $2p_1$ until the region boundary $2pr_1$ between the semi-transmissive region $2p_0$ and the total reflection region $2p_1$ contacts the tangent line $2r_1'$.

Next, the blue excitation light is emitted since the excitation light is reflected by the total reflection region $2p_1$ until the region boundary $2r_2$ of the total reflection region $2p_1$ (the region boundary of the reflection region $2p$) contacts the tangent line $2r_2'$. Then, when the region boundary $2r_2$ of the total reflection region $2p_1$ (the region boundary of the reflection region $2p$) contacts the tangent line $2r_2'$, the cyan light is generated by the excitation light reflected by the reflection region $2p$ and the green light generated by the excitation light transmits the transmission region $2q$.

Figure 14:
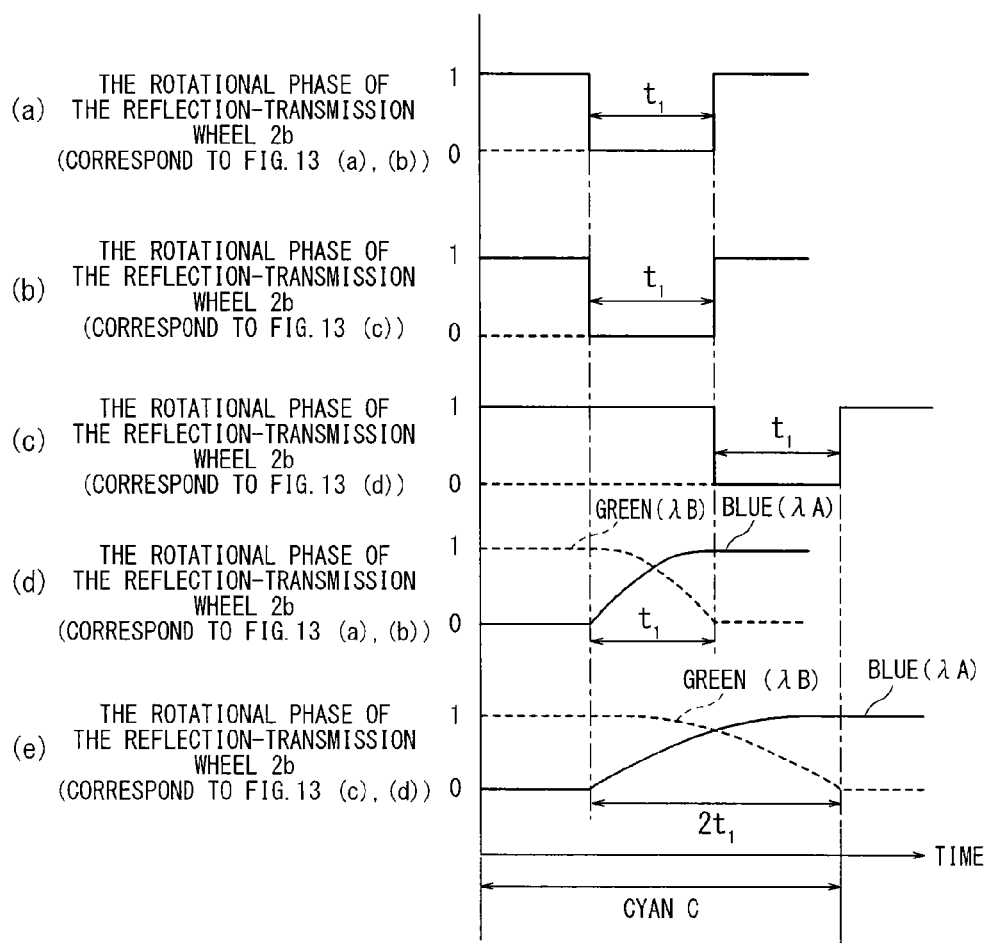
FIG. 14 illustrates an example of a relationship of intensity between the wheel-rotational phase of the reflection-transmission wheel and the illumination wherein (a) is same to FIG. 12(a) and reposted for reference, (b) illustrates the wheel-rotational phase when the boundary between the transmission region and the beam-splitter region on the reflection-transmission wheel shown in FIGS. 13C, 13D, and 13E is passing through the spot region, (c) illustrates the wheel-rotational phase when the boundary between the beam-splitter region and the total reflection region on the reflection-transmission wheel shown in FIGS. 13C, 13D, and 13E is passing through the spot region, (d) is same to FIG. 12(c) and reposted for reference, (e) illustrates a relationship between the intensity of excitation light at the wavelength λA and the intensity of fluorescence at the wavelength λB corresponding to the rotational phase of the reflection-transmission wheel shown in FIG. 12(b)

Therefore, as shown in FIG. 14, the creation time t1 of the cyan C can be adjusted by forming the beam splitter region $2p_0$ on the reflection region $2p_1$.

(Generation of the White Light by the Light Source 2 and the Light Source 3)

In the embodiments described above, it is described that to generate the cyan light while the region boundary $2r_1$, $2r2$ traverses the spot region $2s$. However, if he light source device is configured to control to turn on both the light source 2 and the light source 3 at the same time, the light source device can emits tricolored light of blue, green, and red at the same time, i.e. white light, and highly intensity images can be obtained as shown in FIG. 15, FIG. 16.

Figure 15A:
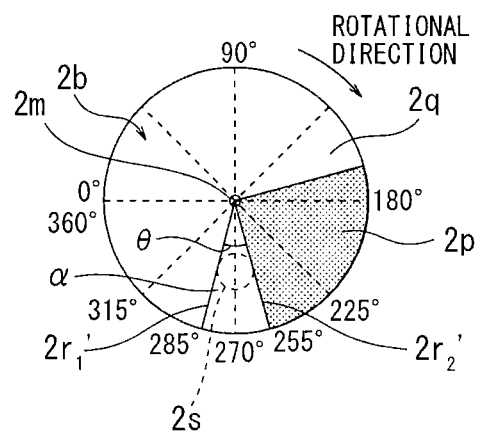
FIGS. 15A, and 15B are same to FIGS. 9A, and 9B and reposted for reference.
Figure 15B:
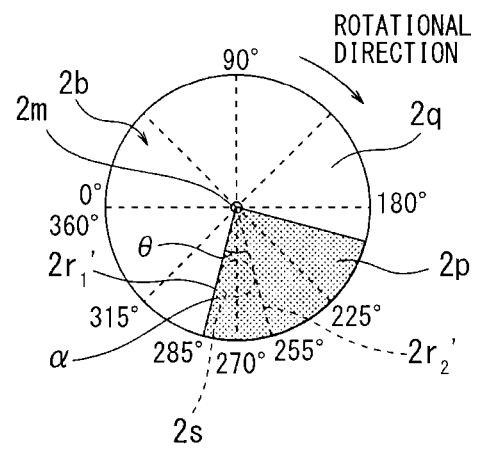
Figure 16:
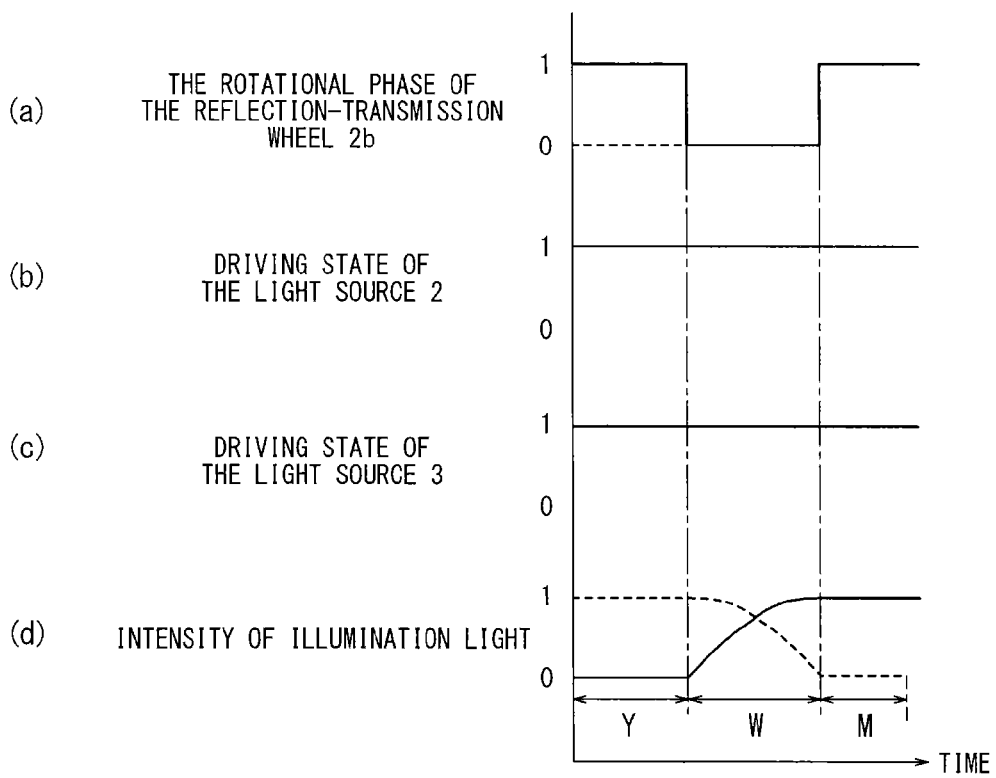
FIG. 16 illustrates white-light generation wherein (a) is same to FIG. 10(a) and reposted for reference, (b) illustrates a driving state of the light source 2, (c) illustrates a driving state of the light source 3, and (d) illustrates a generated white-light.

FIGS. 15A, B are same to FIGS. 9A, B and reposted for reference, and FIG. 16(a) to (d) simplistically illustrate that the white light W can be obtained in the time between yellow Y and magenta M.

(An Example of a Sensor Detecting the Rotational Angle Position of Reflection-Transmission Wheel $2b$ (a Rotation Angle Detector or a Boundary Region Detector))

Figure 17:
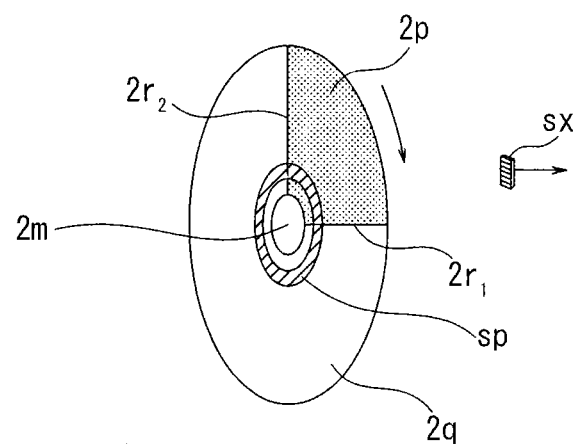
FIG. 17 is a pattern diagram illustrates an example of a sensor detecting the rotational angle position of reflection-transmission wheel.

A ring-shaped rotational angle position detecting pattern Sp is formed around the rotating shaft $2m$ on the reflection-transmission wheel $2b$ as shown in FIG. 17 simplistically. An image sensor Sx forming a part of an encoder is provided at the opposed position of the rotational angle position detecting pattern Sp. And, the rotational angle position detecting pattern Sp is received by the image sensor Sx when passing through the spot region $2s$. The image sensor Sx and the rotational angle position detecting pattern Sp configure the sensor Se.

The image sensor Sx outputs the image signal to the CPU. The CPU can detect the rotational angle position of the reflection-transmission wheel $2b$ since the rotational angle position detecting pattern Sp correspond one-to-one with the rotational angle position.

Note that, a potentiometer that the resistance value varies in proportion to the rotation angle can be used in place of the sensor Se formed of the rotational angle position detecting pattern Sp and the image sensor Sx.

Figure 18:
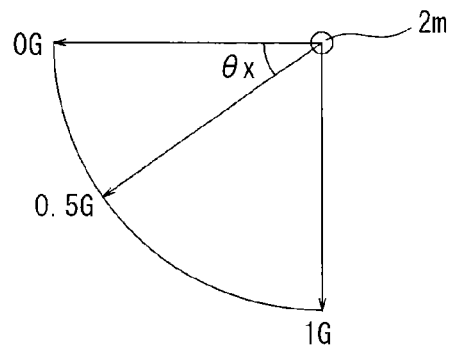
FIG. 18 is a pattern diagram illustrates a relationship between the rotational angle position and the gravity acceleration of an acceleration sensor.

An acceleration sensor can be used to detect the rotational angle position of the reflection-transmission wheel 2b. As shown in FIG. 18 simplistically, acceleration is "0G" when the acceleration sensor (not shown) is in a horizontal position, and the acceleration is "1G" when the acceleration sensor is in a vertical position. There is a sinusoidal relationship between the angle θx and the acceleration.

Thus, the rotational angle position of the reflection-transmission wheel 2b can be detected by converting a gravity acceleration G detected by the acceleration sensor provided on the rotating shaft 2m of the reflection-transmission wheel 2b into the rotational angle position by a sine function. Note that, detection of the rotational angle position is not limited to this.

In the second embodiments, the on/off control of the light source 2 and 3 when the region boundary $2r_1$, $2r_2$ between the transmission region 2q and the reflection region 2p traverses the spot region is described above, but also the on/off control of the light source 2 and 3 in the rest of the time is obviously possible.

<Third Embodiment>

Figure 19:
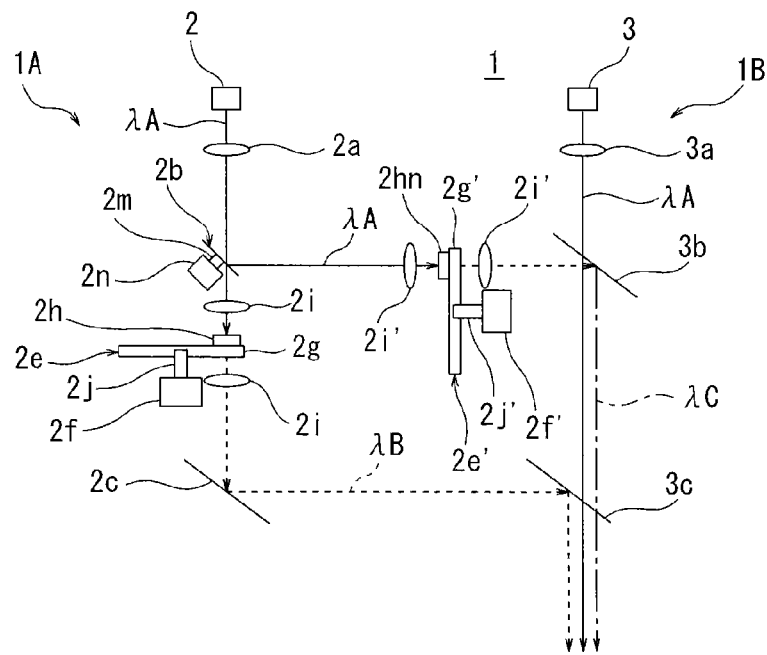
FIG. 19 illustrates an optical system of a light source device according to a third embodiment of the present invention.

In the third embodiment, as shown in FIG. 19, light sources emitting light in the same wavelength λA (e.g. a blue laser diode) are used as both of the light source 2 of the first illumination optical system 1A and the light source 3 of the second illumination optical system 1B. The configuration of the coupling lens 3a, the reflection-transmission wheel 2b, the drive part 2n, and the rotating shaft 2m provided to the first illumination optical system 1A and the configuration of the coupling lens 3a of the second illumination optical system 1B are same to the first embodiment.

The fluorescent wheel 2e as the second fluorescent wheel is provided in the transmission light-path of the first illumination optical system 1A. A pair of collecting elements 2i are provided on both side of the disk-shaped substrate 2g of the fluorescent wheel 2e. In this embodiment, the disk-shaped substrate 2g of the fluorescent wheel 2e is formed of a transmissive material.

The fluorescence property of the fluorescent body 2h of the fluorescent wheel 2e is same as the first embodiment, i.e., the fluorescent body 2h is excited by the light in the wavelength λA and emits the light in a wavelength λB (green). The light in the wavelength λB is collected by the collecting element 2i after transmitting the disk-shaped substrate 2g and reflected by the total reflection mirror 2c to the dichroic mirror 3c.

The fluorescent wheel 2e' as the first fluorescent wheel is provided in the reflection light-path of the first illumination optical system 1A. The disk-shaped substrate 2g' of the fluorescent wheel 2e' is formed of the transmissive material as with the disk-shaped substrate 2g of the fluorescent wheel 2e.

A pair of collecting elements 2i' are provided on both side of the disk-shaped substrate 2g'. A ring-shaped fluorescent body 2hn is provided on the disk-shaped substrate 2g', and the fluorescent body 2hn is excited by the light in the wavelength λA and emits the light in a wavelength λC (red). The light in the wavelength λC (red; 620 nm to 750 nm) is collected by the collecting element 2i' after transmitting the disk-shaped substrate 2g' and led to the dichroic mirror 3b.

The dichroic mirror 3b has a function that transmits the light in the wavelength λA (blue; 400 nm to 450 nm) and reflects the wavelength λC (red; 620 nm to 750 nm). The light in the wavelength λC is reflected by the dichroic mirror 3b and led to the dichroic mirror 3c. The dichroic mirror 3c has a function that transmits the light in the wavelength λA and the light in the wavelength λC and reflects the light in the wavelength λB.

In this embodiment, the light in the wavelength λA from the light source 3 of the second illumination optical system 1B is emitted from the illumination optical system 1 after transmitting the dichroic mirror 3b and the dichroic mirror 3c.

When the reflection region 2p of the reflection-transmission wheel 2b is in the light-path of the first illumination optical system 1A, the light in the wavelength λA from the light source 2 is reflected by the reflection region 2p and led to the fluorescent wheel 2e' provided in the reflection light-path. Then, the fluorescence in the wavelength λC is generated by the light in the wavelength λA as the excitation light, reflected by the dichroic mirror 3b, transmits the dichroic mirror 3c, and emitted from the illumination optical system 1.

When the transmission region 2q of the reflection-transmission wheel 2b is in the light-path of the first illumination optical system 1A, the light in the wavelength λA from the light source 2 transmits the transmission region 2q and led to the fluorescent wheel 2e provided on the transmission light-path. The fluorescence in the wavelength λB is generated by the light in the wavelength λA as the excitation light, reflected by the total reflection mirror 2c and the dichroic mirror 3c, and emitted from the illumination optical system 1.

(An Example of the Irradiation Timing to the Image Generator 16)

Figure 20:
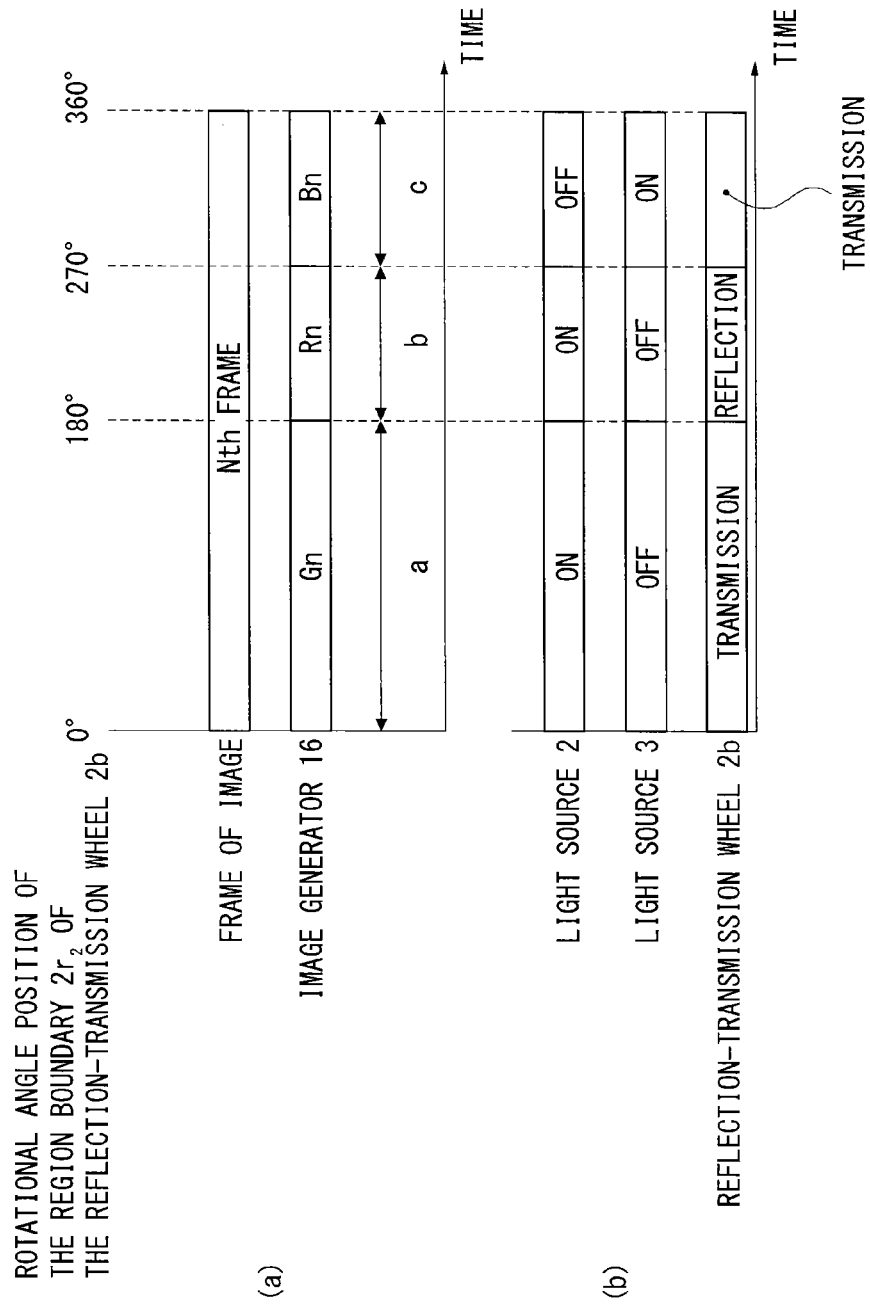
FIG. 20 illustrates an example of a relationship among a color of light which irradiates an image generator by use of the illumination light source shown in FIG. 19, on/off timing of each light source, and reflection/transmission of the reflection-transmission wheel, in relationship to a frame of images.

FIG. 20 simplistically illustrates an example of a relationship among emission timing of the RGB light, on/off timing of the light source 2 and 3, and reflection/transmission timing of the reflection-transmission wheel, of the Nth frame of images.

Here, the creation time of the frame of images is divided into 3 time period, and the time periods are referred by the reference numbers a to c. In the time period a, i.e. the rotational angle position of the region boundary $2r_2$ is within the range of 0 to 90 degrees, the light source 2 is turned on and the light source 3 is turned off by the control section 11, and the transmission region 2q is put in the light-path of the first illumination optical system 1A. Thereby, the image generator 16 is irradiated with the green light (Gn) in the wavelength λB.

In the time period b, i.e. the rotational angle position of the region boundary $2r_2$ is within the range of 180 to 270 degrees, the light source 2 is turned on and the light source 3 is turned off by the control section 11, and the reflection region 2p of the reflection-transmission wheel 2b is put in the light-path of the first illumination optical system 1A. Thereby, the image generator 16 is irradiated with the red light (Rn) in the wavelength λC.

In the time period c, i.e. the rotational angle position of the region boundary $2r_2$ is within the range of 270 to 360 degrees, the light source 2 is turned off and the light source 3 is turned on by the control section 11, and the transmission region 2q of the reflection-transmission wheel 2b is put in the light-path of the first illumination optical system 1A. Thereby, the image generator 16 is irradiated with the blue light (Bn) in the wavelength λA.

Thus, according to this embodiment, each color of RGB can irradiates the image generator 16 in a time frame of the image, and the projection of the full-color images and the white rite become available by use of persistence of vision.

A color tone can be varied by adjusting or changing the length of the time period a, b, and c. For example, to make the projection image being tinged with red by lengthening the time period a in one frame. Furthermore, color temperature can be changed by adjusting or changing the time periods a, b, and c frame by frame.

Also, in this Embodiment, the brightness of projected image can be improved while the region boundary $2r_1$, $2r_2$ between the transmission region $2q$ and the reflection region $2p$ of the reflection-transmission wheel $2b$ traverses the spot region $2s$.

(Other Example of the Emission Timing to the Image Generator 16)

Figure 21:
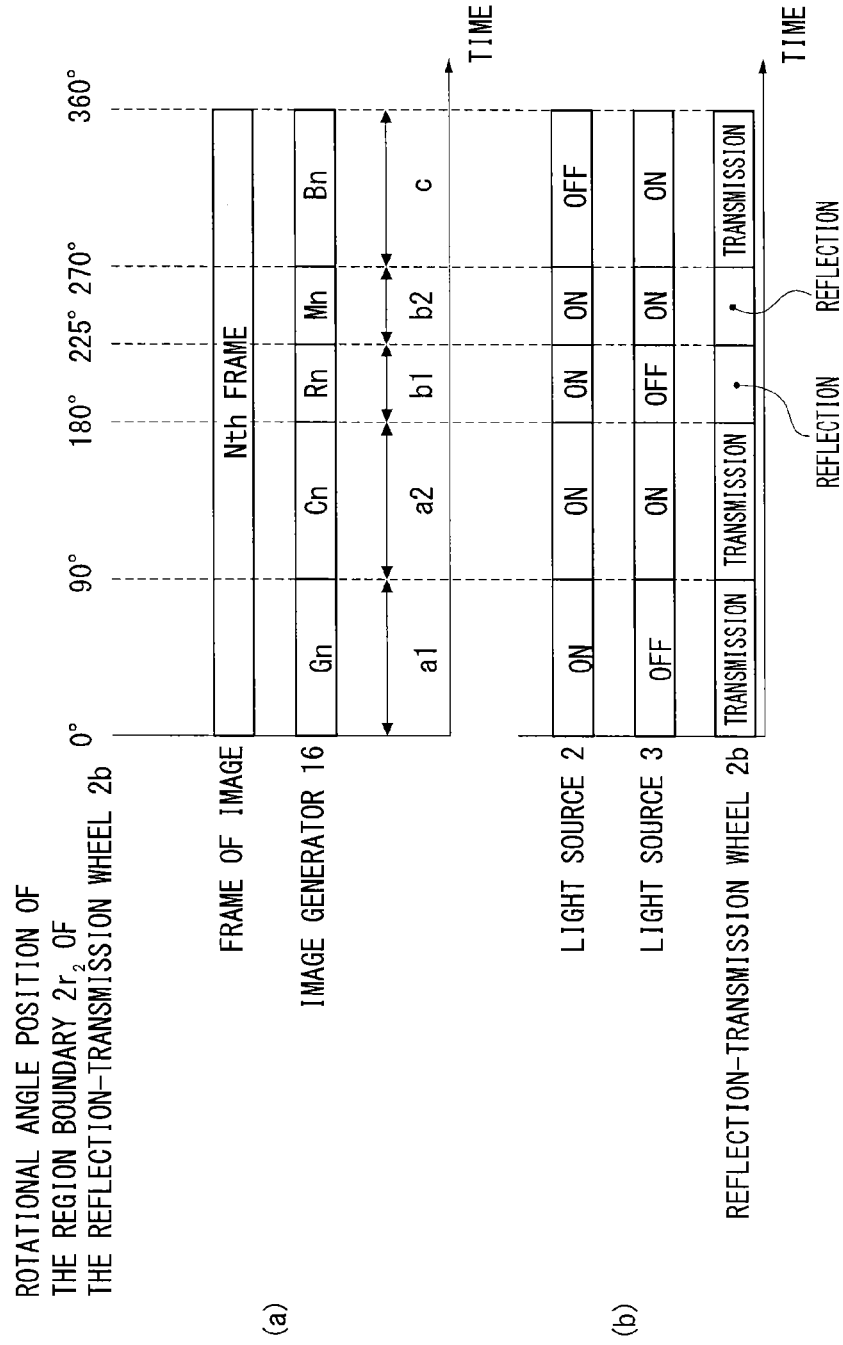
FIG. 21 illustrates another example of a relationship among colors of light irradiating an image generator by use of the illumination light source shown in FIG. 19, on/off timing of each light source, and reflection/transmission of the reflection-transmission wheel, in relationship to a frame of images.

FIG. 21 simplistically illustrates other example of a relationship among emission timing of the RGB light, on/off timing of the light source 2 and 3, and reflection/transmission timing of the reflection-transmission wheel $2b$, of the Nth frame of images.

In the other example, the Nth time period a is divided into the time period a1 and the time period a2, while the Nth time period b is divided into the time period b1 and the time period b2. In the time period a1, i.e. the rotational angle position of the region boundary $2r_2$ is within the range of 0 to 90 degrees, the light source 2 is turned on and the light source 3 is turned off by the control section 11. Furthermore, the transmission region $2q$ is put in the light-path of the first illumination optical system 1A. Thereby, the image generator 16 is irradiated with the green light (Gn) in the wavelength λB.

In the time period a2, i.e. the rotational angle position of the region boundary $2r_2$ is within the range of 90 to 180 degrees, the light source 2 and the light source 3 is turned on in the same time, and the transmission region $2q$ is put in the light-path of the first illumination optical system 1A. Thereby, the cyan illumination light is generated by mixture of the green light in the wavelength λB and the blue light in the wavelength λA, and the image generator 16 is irradiated with the cyan illumination light.

In the time period b1, i.e. the rotational angle position of the region boundary $2r_2$ is within the range of 180 to 225 degrees, the light source 2 is turned on and the light source 3 is turned off by the control section 11. Furthermore, the reflection region $2p$ of the reflection-transmission wheel $2b$ is put in the light-path of the first illumination optical system 1A. Thereby, the image generator 16 is irradiated with the red light (Rn) in the wavelength λC.

In the time period b2, i.e. the rotational angle position of the region boundary $2r_2$ is within the range of 225 to 270 degrees, the light source 2 is turned on and the light source 3 is turned off by the control section 11. Furthermore, the reflection region $2p$ of the reflection-transmission wheel $2b$ is put in the light-path of the first illumination optical system 1A. Thereby, the magenta (Mn) illumination light is generated by mixture of the red (Rn) light in the wavelength λC and the blue light (Bn) in the wavelength λA, and the image generator 16 is irradiated with the magenta illumination light.

In the time period c, i.e. the rotational angle position of the region boundary $2r_2$ is within the range of 270 to 360 degrees, the light source 2 is turned off and the light source 3 is turned on, and the transmission region $2q$ of the reflection-transmission wheel $2b$ is put in the light-path of the first illumination optical system 1A. Thereby, the image generator 16 is irradiated with the blue light (Bn) in the wavelength λA. Also in this case, the occurrence of color mixture is prevented while the brightness of projected image can be improved. Therefore, a brighter projected image can be generated.

<Fourth Embodiment>

Figure 22:
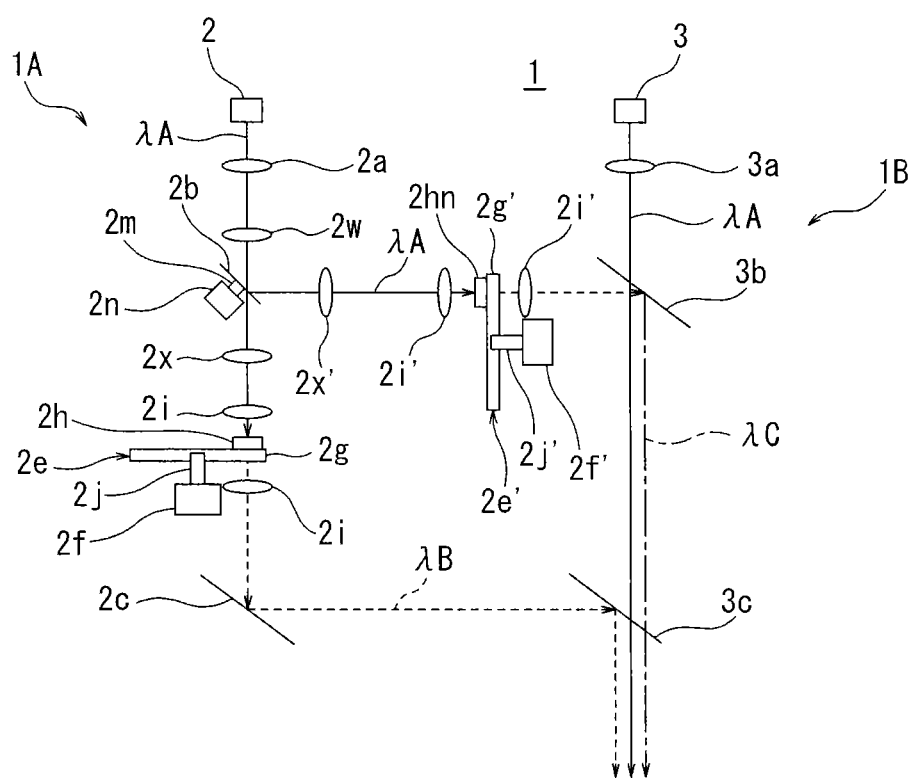
FIG. 22 illustrates an optical system of a light source device according to a fourth embodiment of the present invention.
Figure 23:
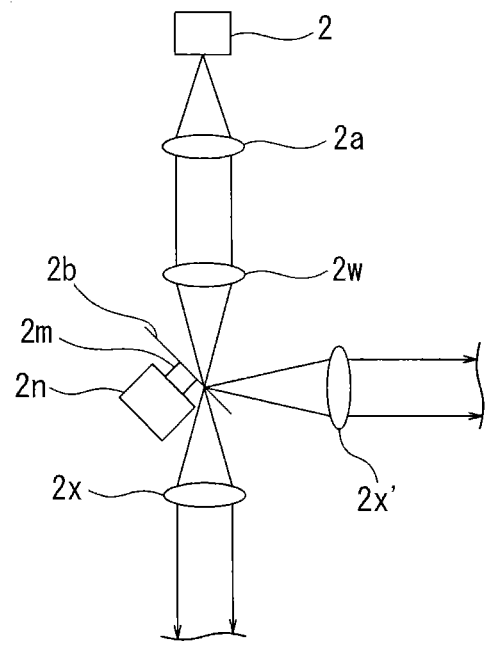
FIG. 23 is a partially enlarged view of the first illumination optical system shown in FIG. 22.

In this fourth embodiment, as shown in FIG. 22, FIG. 23, a collecting element $2w$ is provided in the light-path of the first illumination optical system 1A in addition to the third embodiment, the coupling lens $2x$ is provided in the transmission light-path, and the coupling lens $2x'$ is provided in the reflection light-path. The collecting element $2w$ and the coupling lens $2x$, $2x'$ configure the second optical element together.

According to the fourth embodiment, as shown in FIG. 23, the light in the wavelength λA emitted from the light source 2 is collected by the coupling lens $2a$, led to the collecting element $2w$ as a parallel beam, and converged by the collecting element $2w$, and led to the reflection-transmission wheel $2b$.

When the reflection region $2p$ is in the light-path of the first illumination optical system 1A, the converged light in the wavelength λA is reflected by the reflection region $2p$, led to the coupling lens $2x'$, led to the collecting element $2i'$ by the coupling lens $2x'$ as the parallel beam, converged by the collecting element $2i'$, and irradiates the fluorescent body $2hn$.

When the transmission region $2q$ is in the light-path of the first illumination optical system 1A, the converged light in the wavelength λA transmits the transmission region $2q$ and is led to the coupling lens $2x$, led to the collecting element $2i$ by the coupling lens $2x$ as the parallel beam, converged by the collecting element $2i$, and irradiates the fluorescent body $2h$.

Figure 24:
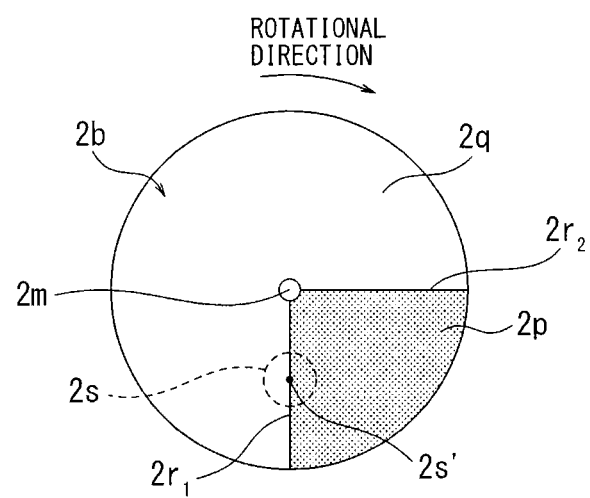
FIG. 24 illustrates the spot region generated on the reflection-transmission wheel by the first illumination optical system shown in FIG. 22.

In the fourth embodiment, as shown in FIG. 24, the dimension of the spot region $2s'$ can be reduced in size compared to the size of the spot region $2s$ of the first illumination optical system 1A in the third embodiment, since a beam in the wavelength λA irradiates the reflection-transmission wheel $2b$ after being converged.

Thus, the time that the region boundary $2r_1$, $2r_2$ between the transmission region $2q$ and the reflection region $2p$ of the reflection-transmission wheel $2b$ passing through the spot region $2s'$ can be shorten.

Therefore, according to the fourth embodiment, the color reproducibility and the brightness of the images can be improved since the creation time of the mixed color light can be adjusted by changing the dimension of the spot region $2s$.

Detailed descriptions are omitted since the other of the configuration and functions are similar to that in the third embodiment.

<Fifth Embodiment>

Figure 25:
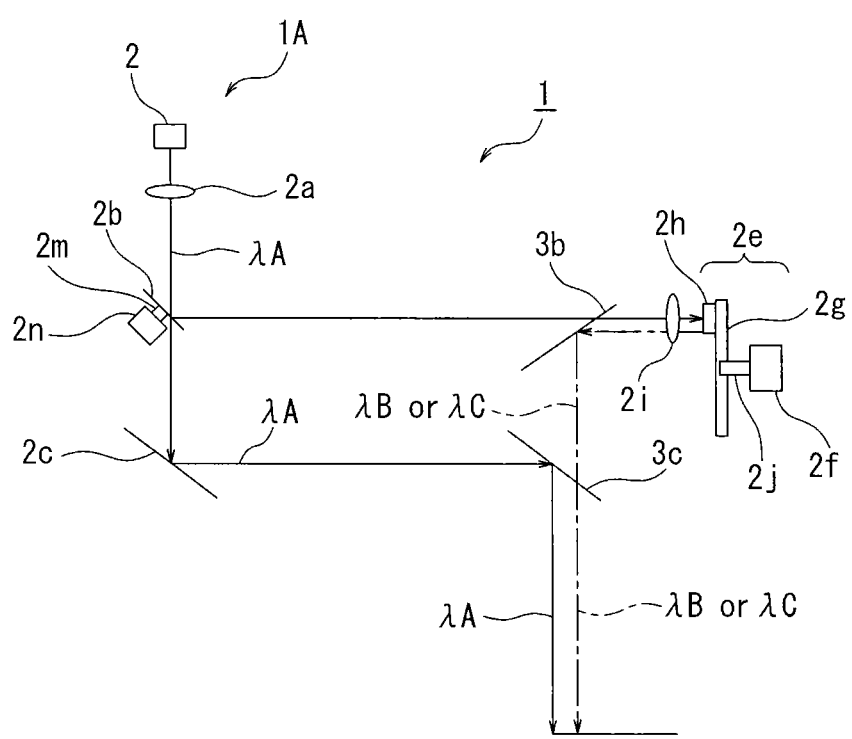
FIG. 25 illustrates an optical system of a light source device according to a fifth embodiment of the present invention.

In this embodiment, the number of the light source of the illumination optical system 1 is one. For this light source, the light source emitting the light in the wavelength λA (blue) as with the first embodiment is used, and referred to as the same reference number 2 as shown in FIG. 25.

Figure 26:
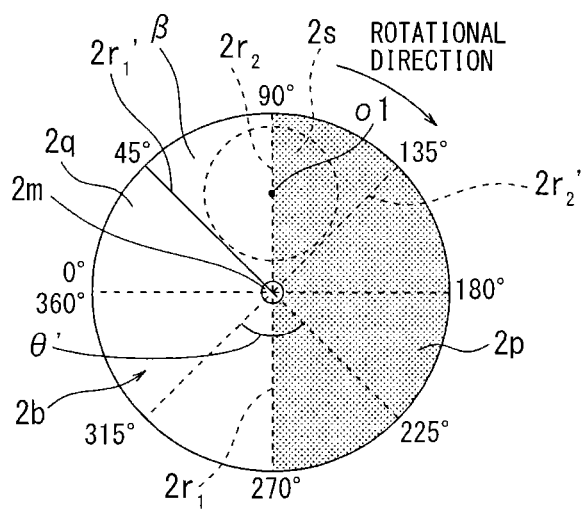
FIG. 26 is a plan view of the reflection-transmission wheel shown in FIG. 25.

As shown in FIG. 26, the reflection-transmission wheel $2b$ is formed of the reflection region $2p$ and the transmission region $2q$ being arranged symmetrically with respect to a straight line passing through the center of the rotating shaft $2m$. The rest of the configuration and the total reflection mirror $2c$ will be described with the same reference numbers as shown in FIG. 1, since they are similar to the first embodiment.

In FIG. 26, the straight line passing through the center of the rotating shaft $2m$ is divided into two lines at the rotating shaft $2m$, and one of them is referred as the radial region boundary $2r_1$, and another one is referred as the radial region boundary $2r_2$.

Figure 27:
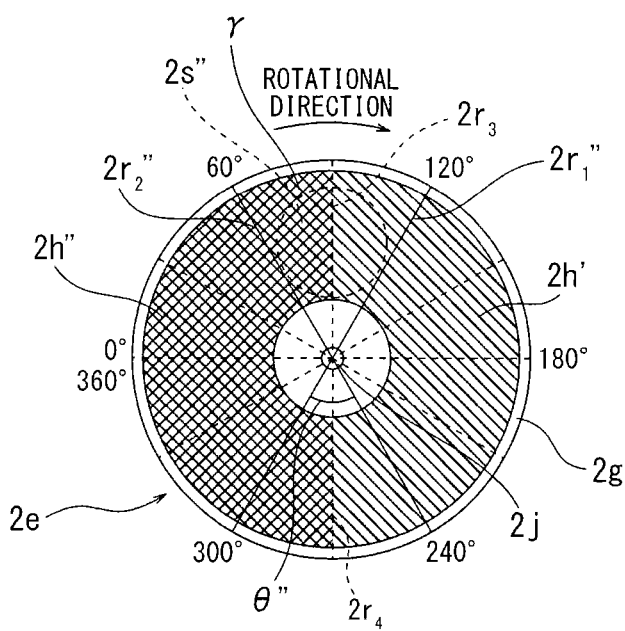
FIG. 27 is a plan view of a fluorescent wheel shown in FIG. 25.

As shown in FIG. 27, the ring-shaped fluorescent body $2h$ of the fluorescent wheel $2e$ is formed of a semicircular fluorescent body $2h'$ emitting the fluorescence in the wavelength λB (green) and a semicircular fluorescent body $2h''$ emitting the fluorescence in the wavelength λC (red) different from the wavelength λB. In this embodiment, the disk-shaped substrate $2g$ is divided into two parts, and semicircular fluorescent bodies 2h', 2h" are formed on the disk-shaped substrate 2g, but the configuration of the fluorescent body 2h is not limited thereto.

In FIG. 27, a straight line passing through the center of the rotating shaft 2j and forming the boundary between the semicircular fluorescent body 2h' and the semicircular fluorescent body 2h" is divided into two lines at the rotating shaft 2j, one of the lines is referred to a radial region boundary $2r_3$ and another one of the lines is referred to a radial region boundary $2r_4$.

The dichroic mirror 3b is provided in the reflection light-path of the reflection-transmission wheel 2b, and the dichroic mirror 3c is provided in the transmission light-path. The dichroic mirror 3b has a function that transmits the light in the wavelength λA, and reflects the light in the wavelength λB, λC.

The drive part 2f is formed of, for example, a stepping motor. The disk-shaped substrate 2g is rotationally driven on the rotating shaft 2j based on a predetermined rotational angle position of the semicircular fluorescent body 2h', h". The blue light in the wavelength λA irradiates the reflection-transmission wheel 2b when the light source 2 is turned on.

When the transmission region 2q is in the light-path of the illumination optical system 1, the blue light in the wavelength λA is led to the transmission region 2q by the coupling lens 2a as a parallel beam and transmits the transmission region 2q, reflected by the total reflection mirror 2c, led to the dichroic mirror 3c, reflected by the dichroic mirror 3c and emitted from the illumination optical system 1.

When the reflection region 2p is in the light-path of the illumination optical system 1, the blue light in the wavelength λA is led to the reflection region 2p by the coupling lens 2a as a parallel beam, reflected by the reflection region 2p, led to the collecting element 2i after transmitting the dichroic mirror 3c, converged by the collecting element 2i, and irradiates the fluorescent wheel 2e.

When the semicircular fluorescent body 2h' of the fluorescent body 2h is irradiated with the blue light in the wavelength λA converged, the fluorescence in the wavelength λB (green) is generated by the blue light as the excitation light, and when the semicircular fluorescent body 2h" is irradiated with the blue light in the wavelength λA converged, the fluorescence in the wavelength λC (red) is generated by the blue light as the excitation light.

The fluorescence in the wavelength λB or λC is collected by the collecting element 2i and led to the dichroic mirror 3b, reflected by the dichroic mirror 3b, and emitted from the illumination optical system 1 after transmitting the dichroic mirror 3c.

(An Example of Irradiation Timing to the Image Generator 16)

Figure 28:
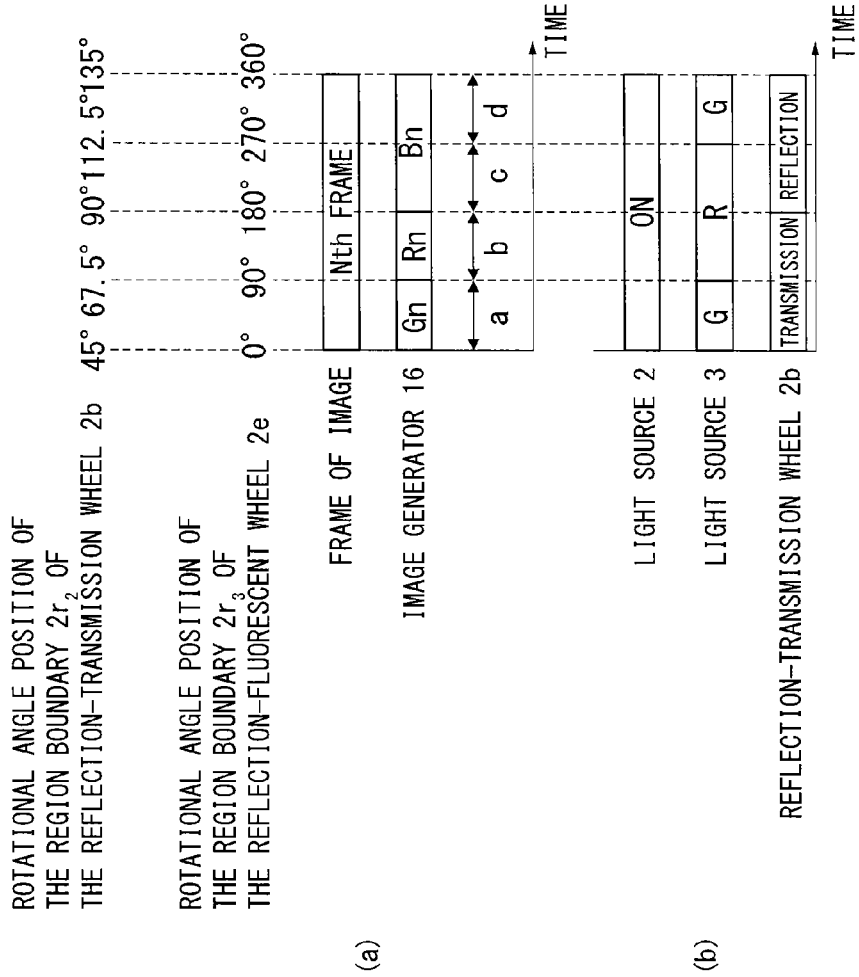
FIG. 28 illustrates an example of a relationship among a color of light which irradiates the image generator by use of the illumination light source device shown in FIG. 25, on/off timing of each light source, and reflection/transmission of the reflection-transmission wheel, in relationship to a frame of images.

FIG. 28 simplistically illustrates an example of a relationship among the irradiation timing of the RGB light, the reflection/transmission timing of the reflection-transmission wheel 2b, and the fluorescent wheel 2e of Nth image frame in the fifth embodiment.

An Nth time frame of images is divided into four time period a, b, c and d. In the time period a, i.e. the rotational angle position of the region boundary $2r_2$ is within the range of 45 to 67.5 degrees (the rotational angle position of the region boundary $2r_3$ is within the range of 0 to 90 degrees), the reflection region 2p is put in the light-path of the first illumination optical system 1A by the control section 11. Furthermore, the rotational angle position of the fluorescent wheel 2e is controlled by the control section 11 so that the semicircular fluorescent body 2h' of the fluorescent wheel 2e is irradiated with the light in the wavelength λA.

Thereby, the green fluorescence (Gn) in the wavelength λB is generated and emitted from the illumination optical system 1 via the dichroic mirror 3b, 3c, and irradiates the image generator 16.

In the time period b, i.e. the rotational angle position of the region boundary $2r_2$ is within the range of 67.5 to 90 degrees (the rotational angle position of the region boundary $2r_3$ of the fluorescent wheel 2e is within the range of 90 to 180 degrees), the reflection region 2p of the reflection-transmission wheel 2b is put in the light-path of the first illumination optical system 1A by the control section 11. Furthermore, the rotational angle position of the fluorescent wheel 2e is controlled by the control section 11 so that the semicircular fluorescent body 2h" of the fluorescent wheel 2e is irradiated with the light in the wavelength λA.

Thereby, the red fluorescence (Rn) in the wavelength λC is generated and emitted from the illumination optical system 1 via the dichroic mirror 3b, 3c, and irradiates the image generator 16.

In the time period c, d, i.e. the rotational angle position of the region boundary $2r_2$ is within the range of 90 to 135 degrees (the rotational angle position of the region boundary $2r_3$ of the fluorescent wheel 2e is within the range of 180 to 360 degrees), the transmission region 2q of the reflection-transmission wheel 2b is put in the light-path of the first illumination optical system 1A by the control section 11. The blue light (Bn) in the wavelength λA transmits the transmission region 2q, and is reflected by the total reflection mirror 2c and the dichroic mirror 3c, and emitted from the illumination optical system 1. At that time, the rotational angle position of the fluorescent wheel 2e is arbitrarily-selected.

Also, in the fifth embodiment, the full-color images can be generated and the white light can be projected as is the case in the first, third and fourth embodiments, since the image generator 16 can be irradiated with the light of the RGB color in a time frame. Furthermore, as is the case in the third embodiment, the color tone and the color temperature can be varied. A detailed description of the projection device is omitted since the projection device identical to the second embodiment is applicable except optical components of the illumination optical system 1.

According to the fifth embodiment, the illumination optical system 1 can be downsized, and the production cost can be reduced, since the number of the optical element of the illumination optical system 1 for the light source can be reduced to be one.

(An Example of Controlling in High-Intensity)

FIG. 29A to FIG. 29G illustrates a relationship between the rotational angle position of the reflection-transmission wheel and the spot region 2s. FIG. 30A to FIG. 30G illustrate a relationship between the rotational angle position of the fluorescent wheel 2e and the spot region 2s".

Note that, in this embodiment, the rotational angle position detecting part of the fluorescent wheel 2e is provided.

In this embodiment, it is assumed that the light source 2 is turned on when the boundary region $2r_2$ traverses the spot region 2s, whereas the light source 2 is turned on/off when the boundary region $2r_1$, $2r_2$ traverses the spot region 2s in the first embodiment.

As shown in FIG. 26, when the boundary region $2r_2$ of the reflection-transmission wheel 2b traverses the spot region 2s, a half of the light in the wavelength λA transmits the transmission region 2q, and the other half is reflected by the reflection region 2p and led to the fluorescent wheel 2e through the reflection light-path.

As shown in FIG. 27, when the boundary region $2r_3$ of the fluorescent wheel 2e traverses the spot region 2s", the light in the wavelength λA from the light source 2 as the excitation light excites the semicircular fluorescent body 2h' and generates the light in the wavelength λB, simultaneously excites the semicircular fluorescent body 2h" and generates the light in the wavelength λC. The fluorescence is emitted from the illumination optical system 1 via the collecting element 2i, the dichroic mirror 3b, and 3c. Thus, the mixed colored light can be generated.

Thus, the control section 11 judges the rotational angle position of the reflection-transmission wheel 2b and the rotational angle position of the fluorescent wheel 2e, and controls the lighting of the light source 2. The angle θ formed by the two tangent lines $2r_1'$, $2r_2'$ extended in the radial direction from the center of the rotating shaft 2m and that contacts the spot region 2s is dependent on a radius of the spot region 2s, and the distance from the center of the rotating shaft 2m to the center of the spot region 2s (the optical axis O1).

Here, the angle θ is, for example, 90 degrees. When the region boundary $2r_1$, $2r_2$ of the reflection-transmission wheel 2b is in a fun-shaped region β enclosed by the two tangent lines $2r_1'$, $2r_2'$ and an arc, and the light source 2 is turned on, the light in the wavelength λA (blue) transmits the transmission region 2q and is reflected by the reflection region 2p at the same time.

The color mixture is also generated when the region boundary $2r_3$, $2r_4$ traverses the spot region 2s". Also, as regarding the fluorescent wheel 2e, the angle θ" formed by the two tangent lines $2r_1"$, $2r_2"$ extended in the radial direction from the center of the rotating shaft 2j and contacts the spot region 2s" is dependent on the radius of the spot region 2s" and the distance from the center of the rotating shaft 2j to the center of the spot region 2s".

Here, it is assumed that the fluorescent wheel 2e rotates in rotating speed of 4 times of the reflection-transmission wheel 2b, and the angle θ" is 60 degrees. Note that, the angle θ', θ" is indicated specifically just for convenience of description, and not limited to the angle θ', θ".

Figure 29A:
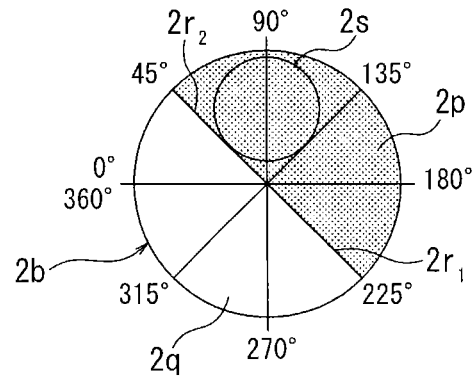
FIG. 29A illustrates the rotational angle position of the reflection-transmission wheel shown in FIG. 26 wherein one boundary is angled at 45 degrees as a reference position.
Figure 29B:
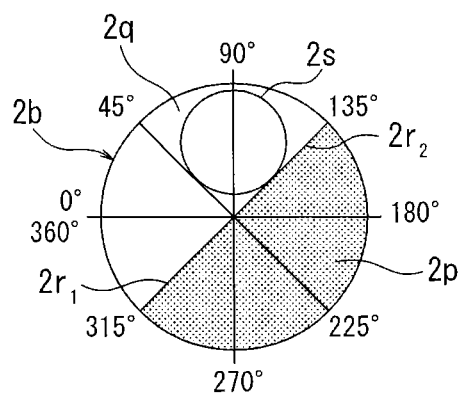
FIG. 29B illustrates the rotational angle position of the reflection-transmission wheel shown in FIG. 26 wherein one boundary is angled at 135 degrees.
Figure 29C:
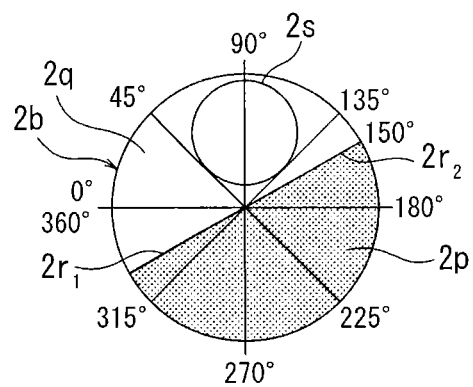
FIG. 29C illustrates the rotational angle position of the reflection-transmission wheel shown in FIG. 26 wherein one boundary is angled at 150 degrees.
Figure 29D:
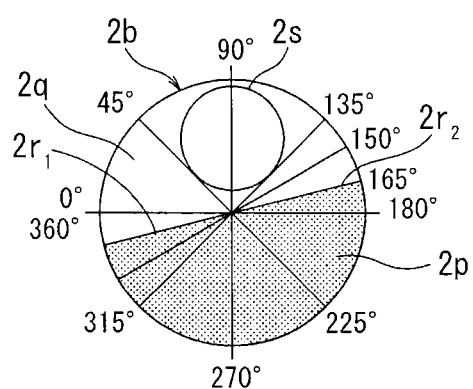
FIG. 29D illustrates the rotational angle position of the reflection-transmission wheel shown in FIG. 26 wherein one boundary is angled at 165 degrees.
Figure 29E:
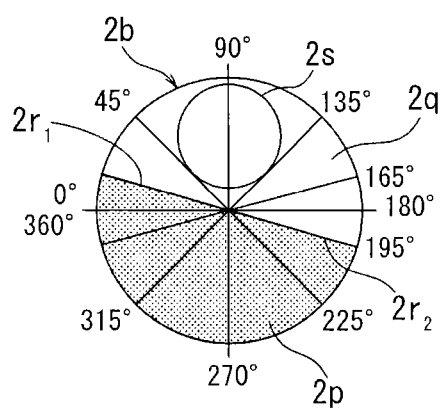
FIG. 29E illustrates the rotational angle position of the reflection-transmission wheel shown in FIG. 26 wherein one boundary is angled at 195 degrees.
Figure 29F:
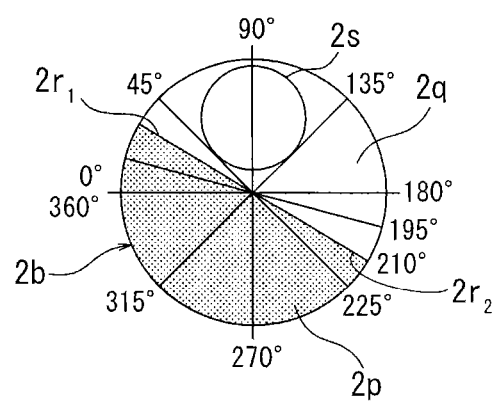
FIG. 29F illustrates the rotational angle position of the reflection-transmission wheel shown in FIG. 26 wherein one boundary is angled at 210 degrees.
Figure 29G:
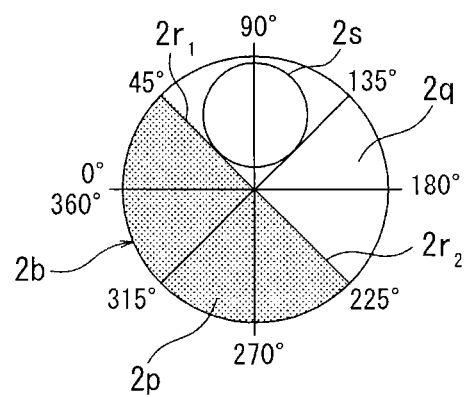
FIG. 29G illustrates the rotational angle position of the reflection-transmission wheel shown in FIG. 26 wherein one boundary is angled at 225 degrees.
Figure 30A:
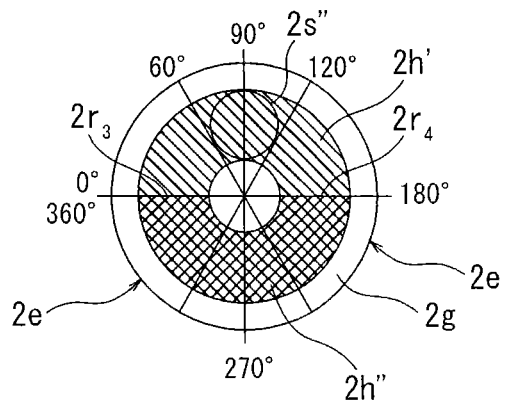
FIG. 30A illustrates the rotational angle position of the fluorescent wheel shown in FIG. 27 wherein one boundary is angled at 0 as a reference position.
Figure 30B:
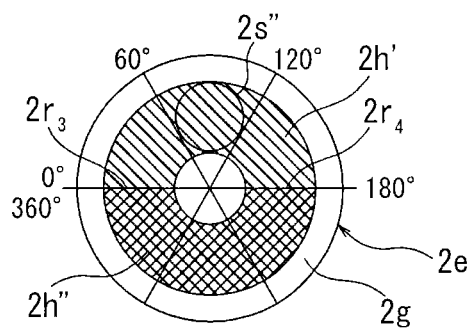
FIG. 30B illustrates again the rotational angle position of the fluorescent wheel shown in FIG. 27 wherein one boundary is angled at 0 degree.
Figure 30C:
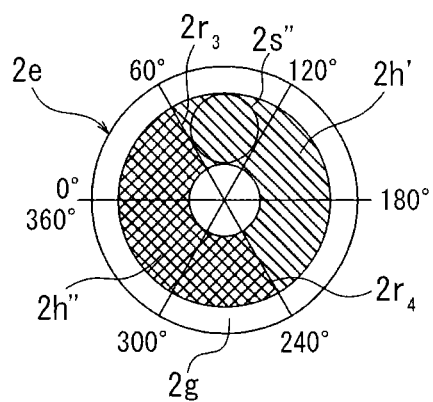
FIG. 30C illustrates the rotational angle position of the fluorescent wheel shown in FIG. 27 wherein one boundary is angled at 60 degrees.
Figure 30D:
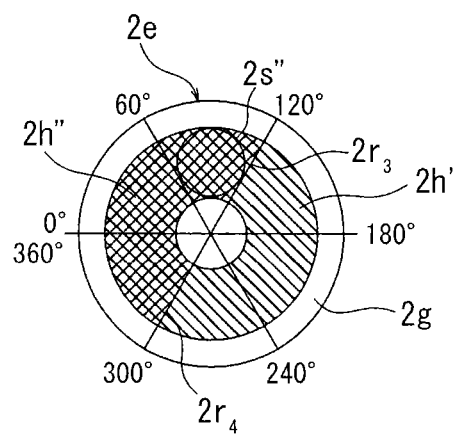
FIG. 30D illustrates the rotational angle position of the fluorescent wheel shown in FIG. 27 wherein one boundary is angled at 120 degrees.
Figure 30E:
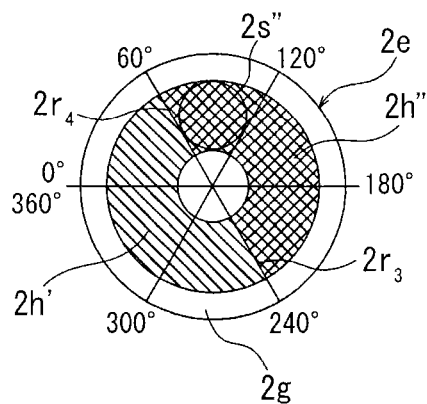
FIG. 30E illustrates the rotational angle position of the fluorescent wheel shown in FIG. 27 wherein one boundary is angled at 240 degrees.
Figure 30F:
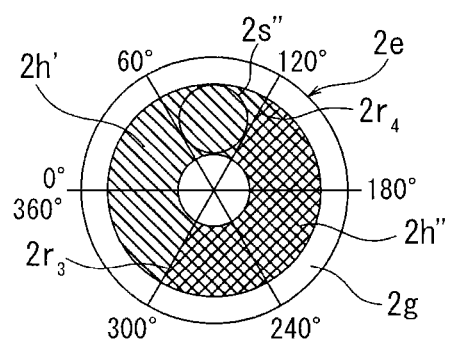
FIG. 30F illustrates the rotational angle position of the fluorescent wheel shown in FIG. 27 wherein one boundary is angled at 300 degrees.
Figure 30G:
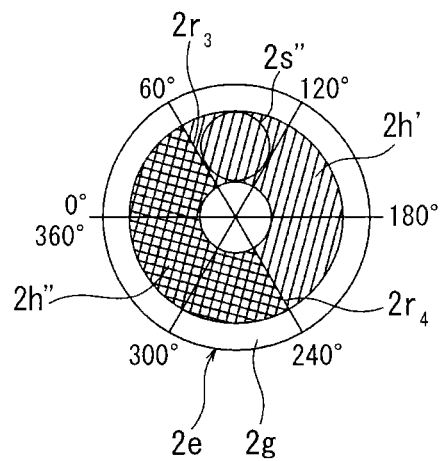
FIG. 30G illustrates the rotational angle position of the fluorescent wheel shown in FIG. 27 wherein one boundary is angled at 60 degrees.

As shown in FIG. 29A, it is assumed that the reflection-transmission wheel 2b starts rotation when the rotational angle position of the region boundary $2r_2$ is within the 45 degrees to the reference angle of 0 degrees, whereas, the fluorescent wheel 2e starts rotation when the region boundary $2r_3$ is in the reference angle i.e. 0 degrees as shown in FIG. 30A.

Figure 31:
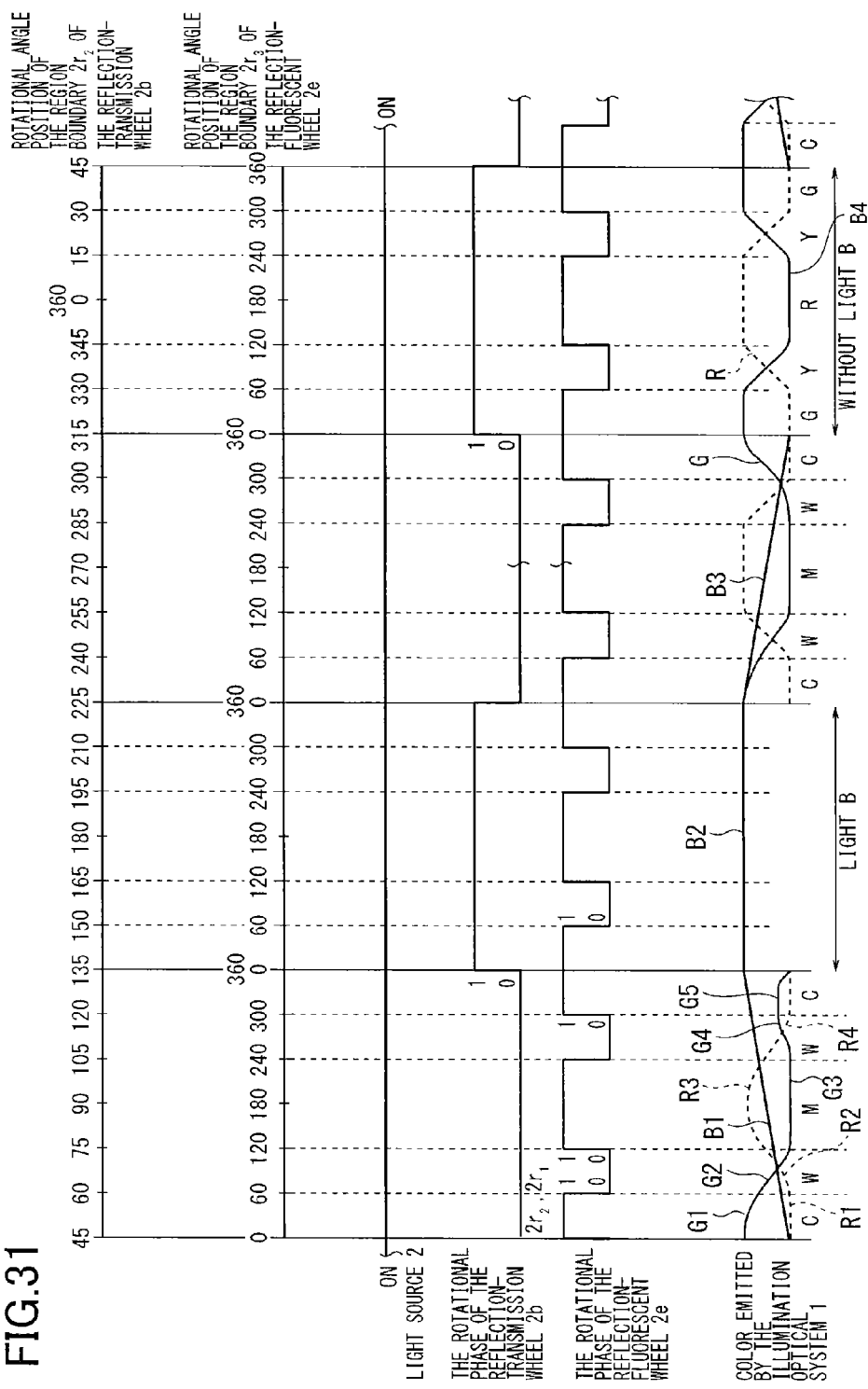
FIG. 31 illustrates a relationship among the rotational angle position of each wheel, the rotational phase of each wheels, and a color of light which irradiates the image generator when the light source 2 is turned on, with using the reflection-transmission wheel shown in FIG. 26 and the fluorescent wheel shown in FIG. 27.

FIG. 31 illustrates a relationship among the rotational angle position of each wheel, the rotational phase of each wheels, and a color of light irradiating the image generator when the light source 2 is turned on, when the reflection-transmission wheel shown in FIG. 26 and the fluorescent wheel shown in FIG. 27 are used.

That is to say, a relationship among the rotation angle (rotational phase) of the region boundary $2r_2$, $2r_1$ of the reflection-transmission wheel 2b, the rotation angle (rotational phase) of the region boundary $2r_3$, $2r_4$ of the fluorescent wheel 2e, and a color of light emitted by the illumination optical system 1 and irradiates the image generator 16 when the light source 2 is turned on is illustrated.

It is shown in FIG. 31 that the rotation angle of four revolution of the fluorescent wheel 2e to the rotation angle of one revolution of the reflection-transmission wheel 2b. The rotational angle position of the reflection-transmission wheel 2b is shown by 15-degree scale whereas the rotational angle position of the fluorescent wheel 2e is shown by 60-degree scale.

It is assumed that the rotational phase of the reflection-transmission wheel 2b is "0" when the region boundary $2r_2$, $2r_1$ is in the spot region 2s and "1" when the region boundary $2r_2$, $2r_1$ is out of the spot region 2s, on the other hand, the rotational phase of the fluorescent wheel 2e is "0" when the region boundary $2r_3$, $2r_4$ is in the spot region 2s.

Hereinafter, a relationship between the rotational phases of the reflection-transmission wheel 2b and the fluorescent wheel 2e, and the on-state of the light source 2 will be described in detail with reference to FIG. 29A to 29G, FIG. 30A to 30G, and FIG. 31. It is assumed that the fluorescent wheel 2e rotates four revolutions per one revolution of the reflection-transmission wheel 2b.

The rotational phase of the reflection-transmission wheel 2b is "0" when the rotational angle position of the region boundary $2r_2$ of the reflection-transmission wheel 2b is within the range of 45 to 135 degrees (see FIG. 29 A and FIG. 29B), since the region boundary $2r_2$ traverses the spot region 2s. On the other hand, the rotational phase of the reflection-transmission wheel 2b is "1" when the rotational angle position of the region boundary $2r_2$ of the reflection-transmission wheel 2b is within the range of 135 to 225 degrees (see FIG. 29B to FIG. 29G), since neither of the region boundaries $2r_1$ and $2r_2$ of the reflection-transmission wheel 2b traverse the spot region 2s.

Light intensity of the excitation light (light B) is increased (see FIG. 31 B1) when the rotational angle position of the region boundary $2r_2$ is within the range of 45 to 135 degrees, since the spot region 2s relatively moves from the reflection region 2p to the transmission region 2q.

The light intensity of the excitation light (light B) is constant (see FIG. 31 B2) when the rotational angle position of the region boundary $2r_2$ is within the range of 135 to 225 degrees, since the spot region 2s is only in the transmission region 2q.

the rotational phase of the reflection-transmission wheel 2b is "0" when the rotational angle position of the region boundary $2r_2$ of the reflection-transmission wheel 2b is within the range of 225 to 315 degrees (not shown), i.e., the rotational angle position of the region boundary $2r_1$ is within the range of 45 to 135 degrees, since the region boundary $2r_1$ traverses the spot region 2s.

The light intensity of the excitation light (light B) emitted from illumination optical system 1 and irradiates the image generator 16 is increased (see the reference number B3 in FIG. 31) when the rotational angle position of the region boundary $2r_2$ is within the range of 225 to 315 degrees, since the spot region 2s relatively moves from the transmission region 2q to the reflection region 2p.

The rotational phase of the reflection-transmission wheel 2b is "1" when the rotational angle position of the region boundary $2r_2$ of the reflection-transmission wheel 2b is within the range of 315 to 45 degrees (not shown), i.e., the rotational angle position of the region boundary $2r_1$ is within the range of 135 to 225 degrees, since neither of the region boundaries $2r_1$ and $2r_2$ traverse the spot region 2s.

When the rotational angle position of the region boundary $2r_2$ is within the range of 315 to 45 degrees, the spot region 2s is only in the reflection region 2p. The excitation light (light B) is not emitted by the illumination optical system 1 and does not irradiates the image generator 16 (see the reference number B4 in FIG. 31).

The rotational phase of the fluorescent wheel 2e is "1" when the rotational angle position of the region boundary $2r_3$ of the fluorescent wheel 2e is within the range of 0 to 60 degrees (see FIG. 30B and FIG. 30C), since neither of the region boundaries $2r_3$, $2r_4$ traverse the spot region 2s".

The green fluorescence (G light) is generated and emitted from the illumination optical system 1 and irradiates the image generator 16 (see the reference number G1 in FIG. 31)

whereas red fluorescence (R light) is not generated (see the reference number R1 in FIG. 31) when the rotational angle position of the region boundary $2r_3$ is within the range of 0 to 60 degrees, since the spot region $2s''$ is only in the semicircular fluorescent body $2h'$.

The rotational phase of the fluorescent wheel $2e$ is "0" when the rotational angle position of the region boundary $2r_3$ of the fluorescent wheel $2e$ is within the range of 60 to 120 degrees (see FIG. 30C and FIG. 30D), since the region boundary $2r_3$ traverses the spot region $2s''$.

The light intensity of the G light which is emitted by illumination optical system 1 and irradiates the image generator 16 is decreased (see FIG. 31 G2), and the R light which is emitted by illumination optical system 1 and irradiates the image generator 16 is increased (see FIG. 31 R2) when the rotational angle position of the region boundary $2r_3$ is within the range of 60 to 120 degrees, the spot region $2s''$ relatively moves from the semicircular fluorescent body $2h'$ to the semicircular fluorescent body $2h''$.

The rotational phase of the fluorescent wheel $2e$ is "1" when the rotational angle position of the region boundary $2r_3$ of the fluorescent wheel $2e$ is within the range of 120 to 240 degrees (see FIG. 30D and FIG. 30E), since neither of the region boundaries $2r_3$, $2r_4$ traverse the spot region $2s''$.

The R light which is emitted by the illumination optical system 1 and irradiates the image generator 16 is constant (see the reference number R3 in FIG. 31) if the light intensity of the excitation light reflected by the reflection region $2p$ is constant when the rotational angle position of the region boundary $2r_3$ is within the range of 120 to 240 degrees, since the spot region $2s''$ is only in the semicircular fluorescent body $2h''$. On the other hand, the G light is not emitted by the illumination optical system 1 and does not irradiates the image generator 16 (see FIG. 31 G3) since the spot region $2s''$ is not in the semicircular fluorescent body $2h'$.

Note that, the light intensity of the R light is not constant in practice since the light intensity of the reflected excitation light is increased or decreased while the rotational phase of the reflection-transmission wheel $2b$ is "0".

The rotational phase of the fluorescent wheel $2e$ is "0" when the rotational angle position of the region boundary $2r_3$ of the fluorescent wheel $2e$ is within the range of 245 to 300 degrees (see FIGS. 30E, 30F), since the region boundary $2r_4$ traverses the spot region $2s''$.

When the rotational angle position of the region boundary $2r_3$ is within the range of 240 to 300 degrees, the spot region $2s''$ relatively moves from the semicircular fluorescent body $2h''$ to the semicircular fluorescent body $2h'$. The light intensity of the R light which is emitted by illumination optical system 1 and irradiates the image generator 16 is decreased (see the reference number R4 in FIG. 31), and the B light which is emitted by illumination optical system 1 and irradiates the image generator 16 is increased (see the reference number G4 in FIG. 31).

The rotational phase of the fluorescent wheel $2e$ is "1" when the rotational angle position of the region boundary $2r_3$ of the fluorescent wheel $2e$ is within the range of 300 to 60 degrees (see FIG. 30F and FIG. 30G), since neither of the region boundaries $2r_3$ and $2r_4$ traverse the spot region $2s''$.

Therefore, the relationship of the rotational phase of the fluorescent wheel $2e$ to the reflection-transmission wheel $2b$ in one revolution of the reflection-transmission wheel $2b$ is that illustrated in FIG. 31.

The spot region $2s''$ is in the semicircular fluorescent body $2h'$ when the rotational angle position of the region boundary $2r_3$ is within the range of 300 to 60 degrees. At the time, the G light is emitted by the illumination optical system 1 and irradiates the image generator 16 (see the reference number G5 in FIG. 31) while the region boundary $2r_3$ is within the range of 300 to 0 degrees since the excitation light λA is led to the fluorescent wheel $2e$ by the reflection region $2p$.

Therefore, the colors of light emitted by the illumination optical system 1 while the fluorescent wheel $2e$ rotates one revolution, equal to that the reflection-transmission wheel $2b$ rotates from the angle 45 to 135 degrees are cyan (C), white (W), magenta (M), white (W), and cyan (C).

Furthermore, the color of light emitted by the illumination optical system 1 while the fluorescent wheel $2e$ rotates one revolution, equal to that the reflection-transmission wheel $2b$ rotates from the angle 135 to 225 degrees, is blue (B).

Similarly, the colors of light emitted by the illumination optical system 1 while the fluorescent wheel $2e$ rotates one revolution, equal to that the reflection-transmission wheel $2b$ rotates from the angle 225 to 315 degrees, are cyan (C), white (W), magenta (M), white (W), and cyan (C).

Also, the colors of light emitted by the illumination optical system 1 while the fluorescent wheel $2e$ rotates one revolution, equal to that the reflection-transmission wheel $2b$ rotates from the angle 315 to 45 degrees, are green (G), yellow (Y), red (R), yellow (Y), and green (G) since there is no B light transmitting the transmission region $2p$ in this angular range.

In this embodiment, it is assumed that the fluorescent wheel $2e$ rotates in rotating speed of 4 times of the reflection-transmission wheel $2b$, but the rotating speed is not limited thereto.

Since the rotational angle position of the reflection-transmission wheel $2b$ and the rotational angle position of the fluorescent wheel $2e$ can be detected by the rotational angle position detector, each colored light of red, green, blue, cyan, magenta, yellow, and white can be generated by controlling the timing of the lighting of the light source 2 and the image generator 16 (DMD), when the dimension of the spot region $2s''$ is detected.

The dimension of the spot regions $2s$, $2s''$ can be determined at the planning phase and memorized in the RAM or the like in the control section 11, and additionally the varying in the dimension of the spot regions $2s$, $2s''$ depending on the driving of the coupling lens $2a$ in direction of the optical axis can be obtained by calculations based on the reference dimension of the spot regions $2s$, $2s''$ which are preset in advance.

Furthermore, the relationship between the rotating speed of the fluorescent wheel $2e$ and the rotating speed of reflection-transmission wheel $2b$ can be memorized as a table.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. An illumination light source device, comprising:
   a reflection-transmission member provided on an exit light-path of an excitation light from an excitation light source and having a transmission region transmits an excitation light as an optical wavelength and a reflection region reflecting the excitation light from the excitation light source, in which the transmission region and the reflection region sequentially traverses the exit light-path of the excitation light from the excitation light source;
   a fluorescent body member provided on at least one of a reflection light-path including the reflection region and a transmission light-path including the transmission region and having a fluorescent body emitting fluorescence when excited by the excitation light;
a control section turning-on the excitation light source while a boundary of the transmission region and the reflection region of a reflection-transmission wheel traverses the light-path of the excitation light;
a first drive part driving the reflection-transmission member so that the transmission region and the reflection region traverse the light-path from the excitation light source;
a second drive part driving the fluorescent body member;
a position detector for boundary region detecting the boundary region of the reflection-transmission member;
a light-path junction element forming a converged light-path by converging the transmission light-path and the reflection light-path, and converging a light flux led through the transmission light-path and a light flux led through the reflection light-path, and emitting converged light flux from the illumination light source device; and
an illumination light source emitting illumination light of a different color from the excitation light and the fluorescence to the converged light-path,
wherein:
the reflection-transmission member includes the reflection-transmission wheel,
the fluorescent body member includes a fluorescent wheel,
the position detector for boundary region includes a rotational angle position detector to detect a rotational angle position of the reflection-transmission member,
the first drive part rotationally drives the reflection-transmission wheel,
the second drive part rotationally drives the fluorescent wheel,
the illumination light source device includes a first illumination optical system comprising at least the excitation light source, the reflection-transmission wheel, the light-path junction element, and the fluorescent wheel, and a second illumination optical system comprising the light source,
the reflection-transmission wheel includes a beam splitter region transmitting a part of excitation light from the excitation light source and reflecting the rest of the excitation light on the reflection region of the reflection-transmission wheel at a forward portion in a rotational direction.

2. A projection device comprising:
the illumination light source device according to claim 1,
the illumination light source device leading the illumination light emitted by the light-path junction element of the illumination light source device, and
a projection light source device projecting images generated by an image generator,
wherein the control section generates the images corresponding to image data by use of a persistence of vision, by dividing a time frame of the image data, and controlling on/off of the excitation light source corresponding to the image data and controlling the image generator.

3. The projection device according to claim 2, wherein:
light which has a color mixture of the color of the excitation light source and the color of the illumination light source by a principle of an additive color system by turning on the excitation light source and the illumination light source in one time frame of the image data is generated.

4. An illumination light source device, comprising:
a reflection-transmission member provided on an exit light-path of an excitation light from an excitation light source and having a transmission region transmits an excitation light as an optical wavelength and a reflection region reflecting the excitation light from the excitation light source, in which the transmission region and the reflection region sequentially traverses the exit light-path of the excitation light from the excitation light source;
a fluorescent body member provided on at least one of a reflection light-path including the reflection region and a transmission light-path including the transmission region and having a fluorescent body emitting fluorescence when excited by the excitation light;
a control section turning-on the excitation light source while a boundary of the transmission region and the reflection region of a reflection-transmission wheel traverses the light-path of the excitation light;
a first drive part driving the reflection-transmission member so that the transmission region and the reflection region traverse the light-path from the excitation light source;
a second drive part driving the fluorescent body member;
a position detector for boundary region detecting the boundary region of the reflection-transmission member;
a light-path junction element forming a converged light-path by converging the transmission light-path and the reflection light-path, and converging a light flux led through the transmission light-path and a light flux led through the reflection light-path, and emitting converged light flux from the illumination light source device; and
an illumination light source emitting illumination light of a different color from the excitation light and the fluorescence to the converged light-path,
wherein:
the reflection-transmission member includes the reflection-transmission wheel,
the fluorescent body member includes a fluorescent wheel,
the position detector for boundary region includes a rotational angle position detector to detect a rotational angle position of the reflection-transmission member,
the first drive part rotationally drives the reflection-transmission wheel,
the second drive part rotationally drives the fluorescent wheel,
the illumination light source device includes a first illumination optical system comprising at least the excitation light source, the reflection-transmission wheel, the light-path junction element, and the fluorescent wheel, and a second illumination optical system comprising the light source,
the first illumination optical system includes an optical element forming a spot region on the reflection-transmission wheel by collecting the excitation light from the excitation light source, and
the optical element is driven in a direction along a light axis to adjust a size of the spot region.

5. An illumination light source device, comprising:
a reflection-transmission member provided on an exit light-path of an excitation light from an excitation light source and having a transmission region transmits an excitation light as an optical wavelength and a reflection region reflecting the excitation light from the excitation light source, in which the transmission region and the reflection region sequentially traverses the exit light-path of the excitation light from the excitation light source;

a fluorescent body member provided on at least one of a reflection light-path including the reflection region and a transmission light-path including the transmission region and having a fluorescent body emitting fluorescence when excited by the excitation light;

a control section turning-on the excitation light source while a boundary of the transmission region and the reflection region of a reflection-transmission wheel traverses the light-path of the excitation light;

a first drive part driving the reflection-transmission member so that the transmission region and the reflection region traverse the light-path from the excitation light source;

a second drive part driving the fluorescent body member;

a position detector for boundary region detecting the boundary region of the reflection-transmission member;

a light-path junction element forming a converged light-path by converging the transmission light-path and the reflection light-path, and converging a light flux led through the transmission light-path and a light flux led through the reflection light-path, and emitting converged light flux from the illumination light source device, wherein:

the reflection-transmission member includes the reflection-transmission wheel, the fluorescent body member includes the fluorescent wheel, the position detector for boundary region includes a rotational angle position detector detecting a rotational angle position of the reflection-transmission member, the first drive part rotationally drives the reflection-transmission wheel, the second drive part rotationally drives the fluorescent wheel, the illumination light source device includes a first illumination optical system comprising at least the excitation light source, the reflection-transmission wheel, the light-path junction element, and the fluorescent wheel, and a second illumination optical system comprising a light source emitting a same colored fluorescence to the excitation light from the excitation light source, the fluorescent wheel includes a first fluorescent wheel provided on the reflection light-path and a second fluorescent wheel provided on the transmission light-path, the first fluorescent wheel and the second fluorescent wheel have a disk-shaped substrate including a transmissive material, the disk-shaped substrate of the first fluorescent wheel has a ring-shaped fluorescent body formed in ring shape and emitting different colored light from the excitation light, and the disk-shaped substrate of the second fluorescent wheel has the ring-shaped fluorescent body formed in ring shape and emitting different colored light from the excitation light and the fluorescence generated by the first fluorescent wheel.

6. The illumination light source device according to claim 5, wherein:

the reflection-transmission wheel has a beam splitter region transmitting a part of the excitation light and reflecting the rest of the excitation light on the reflection region at a forward portion in a direction of the rotation of the reflection-transmission wheel.

7. The illumination light source device according to claim 5, wherein:

the first illumination optical system includes a first optical element forming a spot region on the reflection-transmission wheel by collecting the excitation light from the excitation light source, and the first optical element is driven in a direction along an optical axis to adjust the dimension of the spot region.

8. The illumination light source device according to claim 7, wherein:

the first illumination optical system includes a second optical element forming the spot region on the reflection-transmission wheel by collecting the excitation light from the excitation light source.

9. An illumination light source device, comprising:

a reflection-transmission member provided on an exit light-path of an excitation light from an excitation light source and having a transmission region transmits an excitation light as an optical wavelength and a reflection region reflecting the excitation light from the excitation light source, in which the transmission region and the reflection region sequentially traverses the exit light-path of the excitation light from the excitation light source;

a fluorescent body member provided on at least one of a reflection light-path including the reflection region and a transmission light-path including the transmission region and having a fluorescent body emitting fluorescence when excited by the excitation light;

a control section turning-on the excitation light source while a boundary of the transmission region and the reflection region of a reflection-transmission wheel traverses the light-path of the excitation light;

a first drive part driving the reflection-transmission member so that the transmission region and the reflection region traverse the light-path from the excitation light source;

a second drive part driving the fluorescent body member;

a position detector for boundary region detecting the boundary region of the reflection-transmission member;

a light-path junction element forming a converged light-path by converging the transmission light-path and the reflection light-path, and converging a light flux led through the transmission light-path and a light flux led through the reflection light-path, and emitting converged light flux from the illumination light source device, wherein:

the reflection-transmission member includes the reflection-transmission wheel splitting the light-path of an excitation light into the transmission light-path and the reflection light-path, the fluorescent body member includes a fluorescent wheel, the position detector for boundary region includes a rotational angle position detector detecting a rotational angle position of the reflection-transmission member, the first drive part rotationally drives the reflection-transmission wheel, the second drive part rotationally drives the fluorescent wheel, the fluorescent wheel is provided on either one of the transmission light-path or the reflection light-path, the fluorescent wheel has the fluorescent body formed in ring-shape, the fluorescent body is divided into at least two of an arc-shaped fluorescent body relative to the rotating direction of the fluorescent wheel by a straight line passing through the center of the fluorescent wheel, each of the arc-shaped fluorescent body emits different colored fluorescence from the other due to the excitation light, a first illumination optical system includes a first optical element forming a spot region on the reflection-transmission wheel by collecting the excitation light from the excitation light source, and the first optical element is driven in a direction along an optical axis to adjust the dimension of the spot region.

10. The illumination light source device according to claim 9, wherein:

the rotational angle position of the reflection-transmission wheel and the rotational angle position of the fluorescent wheel are constant relative to each other, the control section detects the timing that the boundary region of the reflection-transmission wheel traverses the light-path of an excitation light by use of a detection signal of a rotational angle detecting section, and controls the lighting of the excitation light source by detecting the timing that the boundary region of the reflection-transmission wheel traverses the light-path of an excitation light.

11. The illumination light source device according to claim 10, wherein:

the rotational angle detecting section is one of an encoder, an acceleration sensor, or a potentiometer.

12. A projection device comprising:

the illumination light source device according to claim 5, the illumination light source device leading the illumination light emitted by the light-path junction element of the illumination light source device, and a projection light source device projecting images generated by an image generator, wherein the control section generates the images corresponding to image data by use of a persistence of vision by dividing a time frame of the image data, and controlling on/off of the excitation light source corresponding to the image data and the image generator.

13. The projection device according to claim 12, wherein:

light of mixed color from the color of the fluorescence generated by the fluorescent wheel and the color of the light from illumination light source is generated by a principle of an additive color system by turning on the excitation light source and the illumination light source in one time frame of the image data.

* * * * *